(12) United States Patent
Anderson et al.

(10) Patent No.: US 10,380,896 B2
(45) Date of Patent: Aug. 13, 2019

(54) CHARACTERIZING PROXIMITY RISKS WITHIN A RADIO MESH

(71) Applicant: Intel Corporation, Santa Clara, CA (US)

(72) Inventors: Glen J. Anderson, Beaverton, OR (US); Willem M. Beltman, West Linn, OR (US); Giuseppe Raffa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/855,488

(22) Filed: Dec. 27, 2017

(65) Prior Publication Data

US 2019/0051183 A1  Feb. 14, 2019

(51) Int. Cl.
 *G01S 5/02* (2010.01)
 *G08G 1/16* (2006.01)
 *H04W 4/40* (2018.01)
 *H04W 4/021* (2018.01)

(52) U.S. Cl.
 CPC ............... *G08G 1/166* (2013.01); *G01S 5/02* (2013.01); *H04W 4/022* (2013.01); *H04W 4/40* (2018.02)

(58) Field of Classification Search
 None
 See application file for complete search history.

(56) References Cited

U.S. PATENT DOCUMENTS

| 2010/0303096 A1* | 12/2010 | Kasher | H04L 1/007 370/474 |
| 2013/0183924 A1* | 7/2013 | Saigh | H04W 4/029 455/404.2 |
| 2017/0215252 A1* | 7/2017 | Wells | H05B 37/0218 |
| 2017/0238129 A1* | 8/2017 | Maier | H04W 4/02 455/404.2 |

OTHER PUBLICATIONS

Gabriel Brown, "Exploring the Potential of mmWave for 5G Mobile Access," White Paper, Jun. 2016, 12 pages, Qualcomm.
"Making 5G mmWave a Commercial Reality in Your Smartphone," presentation, Sep. 2017, 39 pages, Qualcomm.
"Millimeter Waves," Internet article, Apr. 12, 2017, 1 page, retrieved from http://ethw.org/Millimeter_Waves.
"5G Radio Access," White Paper, Apr. 2016, 10 pages, Uen 284 23/3204 Rev C, Ericsson.

* cited by examiner

*Primary Examiner* — Thomas S McCormack
(74) *Attorney, Agent, or Firm* — Spectrum IP Law Group, LLC

(57) ABSTRACT

Methods and apparatus relating to characterizing proximity risks within a radio mesh are described. In an embodiment, collection logic receives risk data from one or more source devices and memory stores the risk data. Pattern logic analyzes the stored risk data to determine existence of one or more risks. The risk data includes results of two-way ping signals communicated between the one or more source devices and a target device. Other embodiments are also disclosed and claimed.

25 Claims, 13 Drawing Sheets

CHARACTERIZING PROXIMITY RISKS WITHIN A RADIO MESH

FIELD

The present disclosure generally relates to the field of electronics. More particularly, an embodiment relates to characterizing proximity risks within a radio mesh.

BACKGROUND

Each year many passengers and pedestrians are injured (or even die) from avoidable accidents. Congestion, population density, topography, and other conditions can have a significant effect on causing these accidents.

Some motor vehicle technologies aim to reduce the number of accidents by providing warning devices such as parking sensors, flashing lights, horns, and backup or parking cameras. Unfortunately, even if these safety devices are properly utilized, there is still a large possibility that an accident occurs, e.g., due to the existence of multiple hazards, hidden hazards, response times, etc. Hence, there is a need to improve safety systems to further reduce the number of potential accidents.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
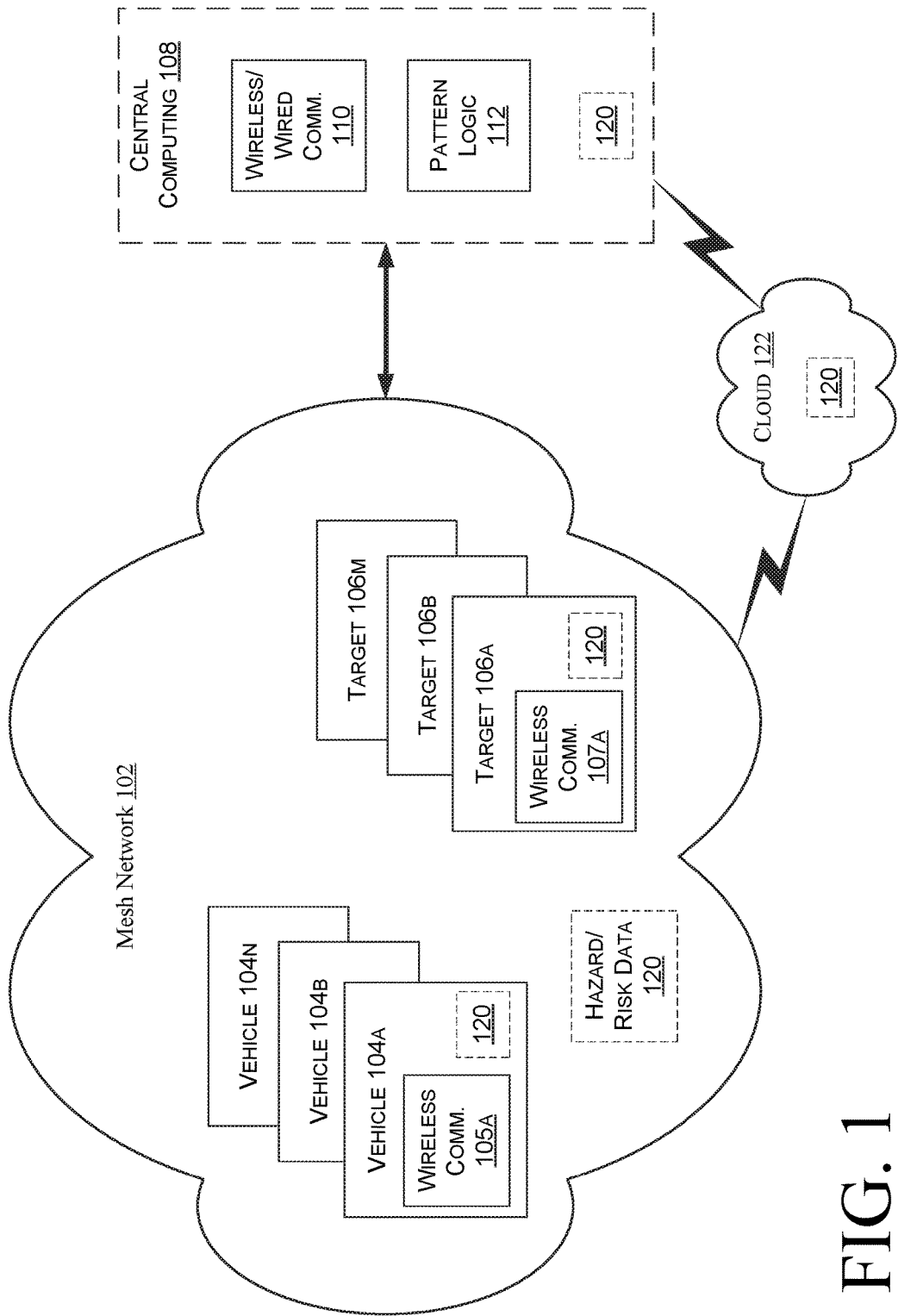
FIG. 1 illustrates a block diagram of a system to provide characterization of proximity risks within a radio mesh.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

As mentioned above, each year many passengers and pedestrians are injured (or even die) from avoidable accidents. Congestion, population density, topography, and other conditions can have a significant effect on the number of such accidents. Some motor vehicle implementations attempt to reduce the number of accidents by providing warning devices such as parking sensors, flashing lights, horns and backup cameras. Unfortunately, even if such devices are properly utilized, there is a large possibility that an accident still occurs, e.g., due to the existence of multiple hazards, hidden hazards, etc.

To this end, some embodiments relate to characterizing proximity risks within a radio mesh. One embodiments utilizes a frequency (or rate of occurrence) distribution map of successful two-way radio ping signals to indicate proximity of devices to each other in a given area. For example, each device with wireless communication capabilities can assist in generating a proximity and/or hazard/risk map. The map information may be augmented with information from stationary (e.g., proximity) sensors or devices (such as traffic management devices) with IoT (Internet of Things) components. The map may then be used to warn one or more devices regarding hazards that are physically proximate to the one or more devices (e.g., based on one or more criterion such as a device's direction of travel, speed, time to hazard, inferred visibility of the other device, relative motion between source and target devices, etc.).

In an embodiment, a central communication device facilitates generation of the proximity map. The central communication device may also warn the other devices about the risks/hazards present. In another embodiment, peer-to-peer communication (i.e., without utilization of the aforementioned central communication device) can be used to generate the proximity map. For example, each mobile device may communicate with other mobile and stationary devices to obtain advanced warning about any potential hazards in a given geographical area (such as a parking lot, one or more street blocks, a factory floor, a warehouse, a grocery store, etc.). In the peer-to-peer implementations, each device may maintain its own relevant map, and may optionally share that map with other devices. For example, if a device determines that it is heading to a specific geographic area/location, it may send out a broadcast message to obtain any existing maps from other devices with access to an existing map of the specific location. In this way, a device may enter a specific area with prior knowledge of hazards/risks.

In some embodiments a risk for one device may be inferred by the radio pings between other devices. For example, even though Device 1 may exchange no successful pings with Device 2, Device 3 may exchange many pings per second with Device 2, while Device 1 and 3 exchange many successful pings per second. Thus the system may infer that Device 1 is proximate to Device 2, and the devices may pose a risk to each other, e.g., depending upon their direction/movement.

In one embodiment, the wireless devices discussed herein may include an IoT device. Moreover, an "IoT" device generally refers to a device which includes electronic processing circuitry (such as one or more processor/cores, PLA (Programmable Logic Array), FPGA (Field Programmable Gate Array), SoC, ASIC (Application Specific Integrated Circuit), etc.), memory (e.g., to store software or firmware), one or more sensors (or is otherwise coupled to one or more sensors such as a camera, motion detector, etc.), and network connectivity to allow the IoT device to collect and/or exchange data. IoT devices can be cheaper than traditional computing devices to allow for their proliferation at remote locations. IoT devices can also reduce costs by using existing infrastructure (such as the Internet, a (third generation (3G), fourth generation (4G), or fifth generation (5G) cellular/wireless network, etc.). More generally, an IoT device may include one or more components such as those discussed with reference to FIGS. 1 et seq.

FIG. 1 illustrates a block diagram of a system to provide characterization of proximity risks within a radio mesh. As shown, a mesh 102 includes one or more vehicles 104A to 104N (such as an automobile, a motorcycle, etc.) as well as one or more targets 106A to 106M. As discussed herein, a target may refer to any item/entity that should be heeded or protected. For example a target may correspond to a device worn by or proximate to a person or living entity (such as a pedestrian, a child, a pet, a bicyclist, a skateboarder, and the like), or otherwise a device associated with a hazard such as a pothole, an obstacle, etc.

As illustrated, each of the vehicles 104 and targets 106 include wireless communication devices (105 and 107, respectively). Each wireless device 105/107 is capable of transmitting and receiving ping signals to facilitate characterization of proximity risks. In one embodiment, a millimeter Wave (mmWave) radio (sometimes referred to as Outreach™) may be used to communicate the ping signals. 5G supports mmWave radio for peer-to-peer communication (e.g., line of sight) up to about 15 meters in the 20+ GHz range with very low latency (e.g., less than about 2 ms for a two-way exchange), high reliability (in part because of the potential high rate of two-way communication), and high density (e.g., signals in the thousands). This is especially useful for peer-to-peer communication for tasks like automotive lane changing (in combination with cameras and LIDAR (Light Detection and Ranging)). Since radio exchanges will be faster than most onboard sensor analyses, the rate of occurrence or frequency of such two-way radio ping signals across devices may be a faster indicator of presence, movement, and/or blind-spots than reports of GPS (Global Positioning System) or Bluetooth signal strength.

As previously discussed, the mesh 102 may operate as a peer-to-peer system in an embodiment. In another embodiment, a central computing device 108 facilitates collection/ generation of proximity and hazard/risk data/information 120, e.g., to generate a proximity risk map. The central communication device may also warn the other devices about the risks/hazards present. The central device 108 includes wireless and/or wired communication devices 110 to allow for wireless/wired communication with one or more components of the mesh network 102 (such as vehicle(s) 104 and/or target(s) 106). The central computing device 108 also includes pattern logic 112 to detect or recognize patterns of concern in the collected proximity and hazard/risk data, as will be further discussed herein.

Referring to FIG. 1, hazard/risk data 120 may be stored in any type of memory (including volatile or non-volatile memory) discussed herein. Also, the hazard/risk data 120 may be stored in one or more locations such as in the vehicle(s) 104, target(s) 106, mesh network 102, central computing device 108, cloud 122, etc. Furthermore, the mesh network 102 may be implemented using technology discussed with reference to FIG. 4. Also, communication devices 105/107/110 may operate as discussed with reference to FIGS. 5-7. Each device of FIG. 1 may include one or more components discussed herein with reference to FIGS. 8-13.

Figure 2:
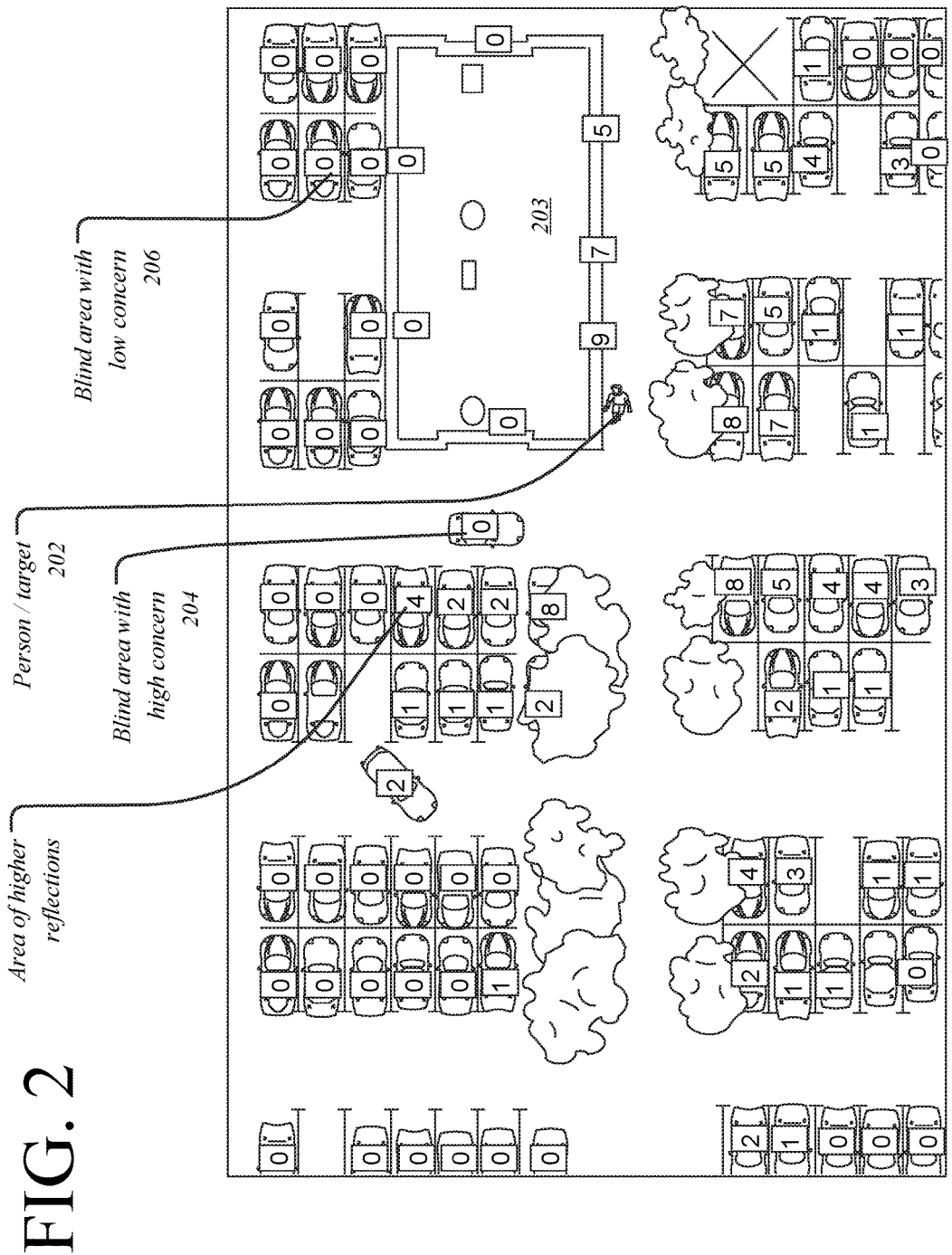
FIG. 2 illustrates top view map of sample vehicles and targets, according to an embodiment.

FIG. 2 illustrates top view map of sample vehicles and targets, according to an embodiment. More particularly, FIG. 2 shows various items/entities in a parking lot (such as vehicles, a pedestrian, location of blind spots and higher reflection, etc.). The number boxes in FIG. 2 correspond to the number of successful two-way pings during some period (e.g., 100 ms but longer or shorter periods may be used depending on the implementation).

In the example of FIG. 2, the target is a pedestrian 202 and as can be seen vehicles closest to the target 202 tend to have a higher number of successful two-way pings when compared with vehicles that are further away from the target 202. For example, between the person 202 and the edge of the building 203, 9 successful two-ways pings are occurring per 100 ms. At greater distances and around blind corners, 0 successful two-way pings are occurring. Some numbers are for areas of high reflection. In some embodiments, reflected signals could be eliminated from the analysis based on time of arrival (see discussion below on measurable delay in reflected signals), but reflected signals could be beneficial for some analyses.

In an embodiment, vehicles and/or stationary devices (e.g., such as those shown on the perimeter of building 203) may communicate risk-related data. FIG. 2 also illustrates blind areas (e.g., with high concern 204 near the target 202 and with low concern 206 away from the target 202).

Moreover, since parking lots can be busy places where people may be at risk, faster mmWave proximity indicators can be valuable to supplement existing methods of detection. Moreover, use of a mesh network (e.g., network 102 pf FIG. 1) with stationary MECs (Multi-access Edge Computing devices) to identify presence of a device addresses complex, dynamic environments with obstructions, whereas some current implementations may only rely on GPS or other position sensing to locate a target. However, the time needed for GPS data acquisition and transfer as well as analysis of machine vision could make the difference in preventing an accident. Also, Bluetooth is severely limited to the number of devices in a vicinity before interference is too strong. And, RSSI (Received Signal Strength Indication) only addresses rough movements and not fine-grained ones nor direction. In an example application, children could wear wireless devices that participate in the mesh network 102 of FIG. 1. And, based on timing across radio detection from a group of vehicles, an embodiment could quickly alert vehicles to an unseen person (e.g., a child) as well as activate camera(s) and/or display(s). For example, if the system detects a child device in the mesh, the system may activate an overhead camera and send the camera feed to a display in a vehicle that is visible to the operator of the vehicle. Alternatively, it may activate a camera on the vehicle and a display within the vehicle.

Figure 3:
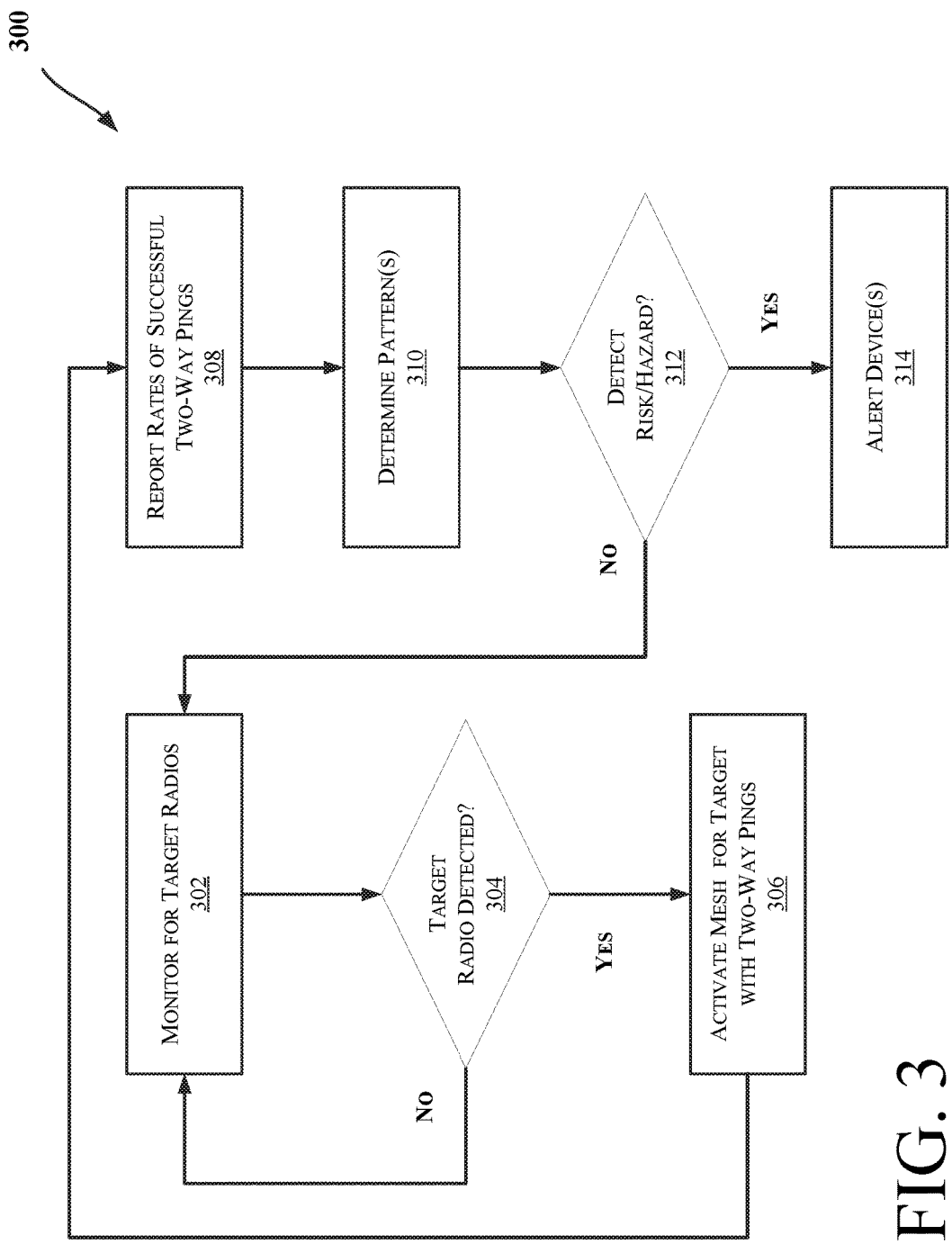
FIG. 3 illustrates a flow diagram of a method for characterizing proximity risks within a radio mesh, according to an embodiment.

FIG. 3 illustrates a flow diagram of a method 300 for characterizing proximity risks within a radio mesh, according to an embodiment. One or more operations of method 300 may be performed by logic (e.g., logic 112) and/or one or more components discussed herein with reference to FIGS. 1-13 (such as a processor, a GPU, an FPGA, etc.).

Referring to FIG. 3, operation 302 monitors for target radios. Once a target radio is detected at operation 304, the mesh network (e.g., network 102 of FIG. 1) is activated for the detected target with two-way ping signals at operation 306. For example, each vehicle 104 transmits a ping signal to the detected target and records and/or reports the response/acknowledgement from the detected target at operation 308. The reporting allows for the rates of successful two-way pings during a select period (e.g., about 100 ms, or in accordance with the mmWave being used in an embodiment). In the embodiments that rely on peer-to-peer mesh networks instead of those with a central computing device (e.g., device 108 of FIG. 1), operation 308 may just result in reporting of the rates of successful two-way pings between the peer devices. The data reported at operation 308 may be collectively referred to herein as hazard/risk data or information.

Operation 310 determines any existing pattern(s) in the risk data. Once a risk or hazard is detected from the determined pattern(s) at operation 312, one or more devices (e.g., vehicles proximate to the target and/or the target, e.g., where vehicle-target proximity is determined based on that vehicle's speed or direction/heading, and/or the target's speed and/or direction/heading) are altered at operation 314. If no risks or hazards are detected at operation 312, method 300 resumes with operation 302.

In at least one embodiment, a "ping" signal includes the class (e.g., pedestrian, child, pet, etc.) and potentially the ID (Identifier or Identification) of the device. The recipient or the central computing system (e.g., device 108 of FIG. 1 or another peer) could check to see if the class or particular device is a target of concern, such as a child wearable class that may identify the type of device but not the specific child, for example.

The patterns of concern (determined at operation 310) could be created in various ways. For example a static set of patterns could be defined in which the distribution of rates across a specific parking area or other corner are of concern. In the example of FIG. 2, the ring of high rates stops abruptly in the vicinity of a moving car; thus, indicating a possible blind approach to a pedestrian. Also, a pattern match within select ranges would result in an alert message being sent to the moving car at operation 314.

In a supervised deep learning approach (see, e.g., FIGS. 12 and 13), the neural network would be trained with many examples of target devices having two-way pings across the mesh network, and risky configurations could be human-identified with ground truth. Further, a single identification of a risky situation could be matched to thousands of antenna switching adjustments, thus allowing deep learning of antenna configurations for detecting a risky pattern of signals. The training could extend across different sets of vehicles and locations/parking lots.

Stationary MECs (Multi-access Edge Computing devices) would have a special significance in the mesh network since they are located at a precisely known position. MEC radios on the periphery of a visual and radio obstruction would report a frequency pattern that takes the radio obstructions into account. The MECs in the mesh network would also allow more definitive locating/positioning of targets.

Also, existence of reflection in mmWave may be used to for movement tracking as well as obstacle presence. For example, mmWave radio receivers would usually be concerned with optimizing the signal, perhaps switching across an antenna array to optimize signal propagation. In one embodiment, keeping the antenna constant allows the dynamics of the target's movement to be tracked by successful two-way ping signals. Delayed pings via reflections could also be used in determining whether obstructions are present. Moreover, timing of reflected versus direct timing of mmWave signals can be used for tracking. Since mmWave devices can have many antennas (perhaps hundreds eventually), they allow dynamic adjustment for optimizing amplitude and phase. For example, the additional reflections from other antennae may provide alternative routes for delay comparisons.

Accordingly, one or more embodiments assume all objects and people supported by the system would have access to at least one radio for communication of the two-way ping signals. In an embodiment, a central control point (e.g., device 108 of FIG. 1) would monitor the mesh and issue status and alerts to devices such as vehicles or pedestrians. This approach improves on radio-proximity only implantations in several ways: (1) proximity would be exposed through a trend in successful two-way radio pings across a mesh in a given space (including lack of pings in blind areas); (2) detection of a special target (such as a child's device) could increase the rate of signaling across the mesh (to increase the resolution—more pings per second); (3) stationary MECs would have a special significance in the mesh since they are located at a precisely known position (for example, MEC radios on the periphery of a visual and radio obstruction would report a frequency pattern that takes the radio obstructions into account); (4) radio obstructions would be characterized by machine learning of patterns of (e.g., mmWave) radio signals around it or of camera views, and the system would use the obstruction pattern in tracking; (5) reflected waves can be used to help determine probability of obstructions; (6) antenna switching can enable multiple analyses of the target; (7) machine learning (especially deep learning, see, e.g., FIGS. 12-13) of (e.g., mmWave) antenna switching may be used to optimize detection of hazards in a given local, such as a specific parking lot; (8) 5G radios could enable multiple concurrent target assessments with the mesh network; and/or (9) GPS could optionally be used to determine whether devices are in the same general vicinity, and it could be used to compare to a map of proximity risks (e.g., if proximity is indicated as risky by GPS but radio connectivity is not established, an obstruction could be inhibiting radio waves and visual detection).

Figure 4:
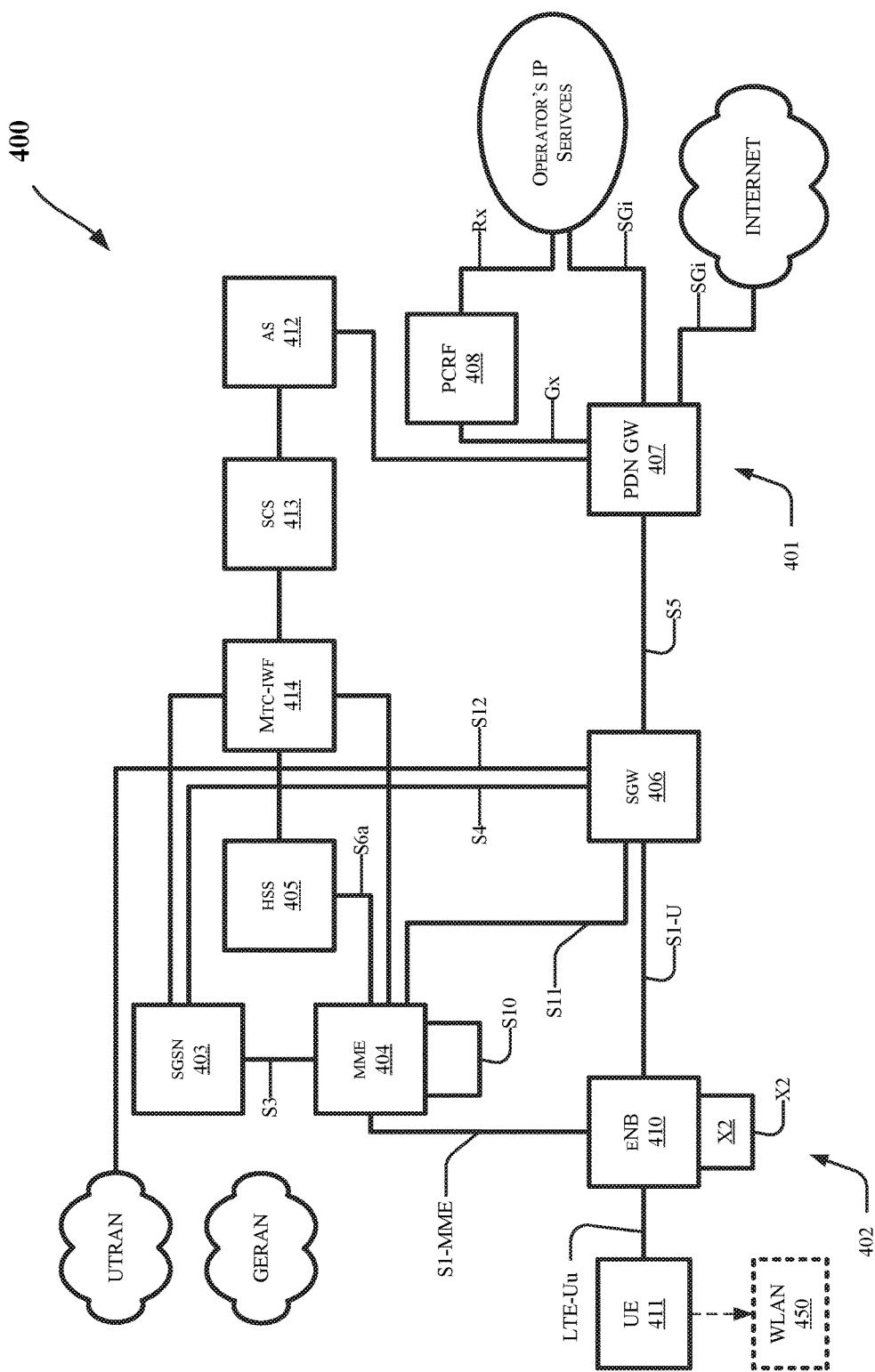
FIG. 4 shows an exemplary block diagram of the overall architecture of a 3GPP LTE network that includes one or more devices that are capable of implementing one or more techniques discussed herein, according to some embodiments.

FIG. 4 shows an exemplary block diagram of the overall architecture of a Third Generation Partnership Project (3GPP) Long Term Evolution (LTE) network 400 that includes one or more devices that are capable of implementing one or more techniques discussed herein, according to some embodiments. FIG. 4 also generally shows exemplary network elements and exemplary standardized interfaces. At a high level, network 400 comprises a Core Network (CN) 401 (also referred to as an Evolved Packet System (EPC)), and an air-interface access network E-UTRAN (Evolved Universal Terrestrial Radio Access Network) 402. CN 401 is responsible for the overall control of the various User Equipment (UE) coupled to the network and establishment of the bearers. CN 401 may include functional entities, such as a home agent and/or an ANDSF (Access Network Discovery and Selection Function) server or entity, although not explicitly depicted. E-UTRAN 402 is responsible for all radio-related functions.

Exemplary logical nodes of CN 401 include, but are not limited to, a Serving GPRS Support Node (SGSN) 403, Mobility Management Entity (MME) 404, a Home Subscriber Server (HSS) 405, a Serving Gateway (SGW) 406, a PDN Gateway (or PDN GW) 407, and a Policy and Charging Rules Function (PCRF) Manager logic 408. The functionality of each of the network elements of CN 401 is generally in accordance with various standards and is not described herein for simplicity. Each of the network elements of CN 401 are interconnected by exemplary standardized interfaces, some of which are indicated in FIG. 4, such as interfaces S3, S4, S5, etc.

While CN 401 includes many logical nodes, the E-UTRAN access network 402 is formed by at least one node, such as evolved NodeB 410 (Base Station (BS), eNB (or eNodeB that refers to evolved Node B)), which couples to one or more UE 411, of which only one is depicted in FIG. 4 for the sake of simplicity. UE 411 is also referred to herein as a Wireless Device (WD) and/or a Subscriber Station (SS), and may include an M2M (Machine to Machine) type device. In one example, UE 411 may be coupled to eNB by an LTE-Uu interface. In one exemplary configuration, a single cell of an E-UTRAN access network 402 provides one substantially localized geographical transmission point (e.g., having multiple antenna devices) that provides access to one or more UEs. In another exemplary configuration, a single cell of an E-UTRAN access network 402 provides multiple geographically substantially isolated transmission points (each having one or more antenna devices) with each transmission point providing access to one or more UEs simultaneously and with the signaling bits defined for the one cell so that all UEs share the same spatial signaling dimensioning.

For normal user traffic (as opposed to broadcast), there is no centralized controller in E-UTRAN; hence the E-UTRAN architecture is said to be flat. The eNBs can be interconnected with each other by an interface known as "X2" and to the EPC by an S1 interface. More specifically, an eNB is coupled to MME 404 by an S1 MME interface and to SGW 406 by an S1 U interface. The protocols that run between the eNBs and the UEs are generally referred to as the "AS protocols." Details of the various interfaces can be in accordance with available standards and are not described herein for the sake of simplicity.

The eNB 410 hosts the PHYsical (PHY), Medium Access Control (MAC), Radio Link Control (RLC), and Packet Data Control Protocol (PDCP) layers, which are not shown in FIG. 4, and which include the functionality of user-plane header-compression and encryption. The eNB 410 also provides Radio Resource Control (RRC) functionality corresponding to the control plane, and performs many functions including radio resource management, admission control, scheduling, enforcement of negotiated Up Link (UL) QoS (Quality of Service), cell information broadcast, ciphering/deciphering of user and control plane data, and compression/decompression of DL/UL (Downlink/Uplink) user plane packet headers.

The RRC layer in eNB 410 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 411, generates pages for UEs 411 over the air, broadcasts system information, controls UE measurement reporting, such as the periodicity of Channel Quality Information (CQI) reports, and allocates cell-level temporary identifiers to active UEs 411. The RRC layer also executes transfer of UE context from a source eNB to a target eNB during handover, and provides integrity protection for RRC messages. Additionally, the RRC layer is responsible for the setting up and maintenance of radio bearers. Various types of (WLAN) may be supported such as any of those discussed herein.

As mentioned above in the background section, recently, significant momentum has started to build around the idea of a next generation, or Fifth Generation (5G), wireless communications technology. A wide range of applications and services may be used with 5G systems, such as: (a) Enhanced Mobile Broadband: providing higher data rates will continue to be a key driver in network development and evolution for 5G system (for example, it can be envisioned that a peak data rate of more than 40 Gps and a minimum guaranteed user data rate of at least 400 Mbps be supported for 5G system); (b) Massive Machine Type Communications (MTC): support of a massive number of Internet of Things (IoT) or MTC devices may become one key feature for 5G system (for example, where MTC devices used for many applications may utilize low operational power consumption and be expected to communicate with infrequent small burst transmissions); and/or (c) Ultra-reliable and low latency or mission critical communications: support of mission critical MTC applications for 5G system may provide extremely high level of reliable connectivity with guaranteed low latency, availability, and reliability-of-service.

As mentioned above, mobile communication has evolved significantly from early voice systems to today's highly sophisticated integrated communication platform. The next generation wireless communication system, 5G, aims to provide access to information and sharing of data anywhere, anytime by various users and applications. 5G is expected to be a unified network/system that target to meet vastly different and sometime conflicting performance dimensions and services. Such diverse multi-dimensional goals are driven by different services and applications. In general, 5G will evolve based on 3GPP LTE-Advanced with additional potential new Radio Access Technologies (RATs) to enrich people's lives with better, simpler, and more seamless wireless connectivity solutions. 5G aims to enable everything connected by wireless and deliver fast, rich content and services.

Figure 5:
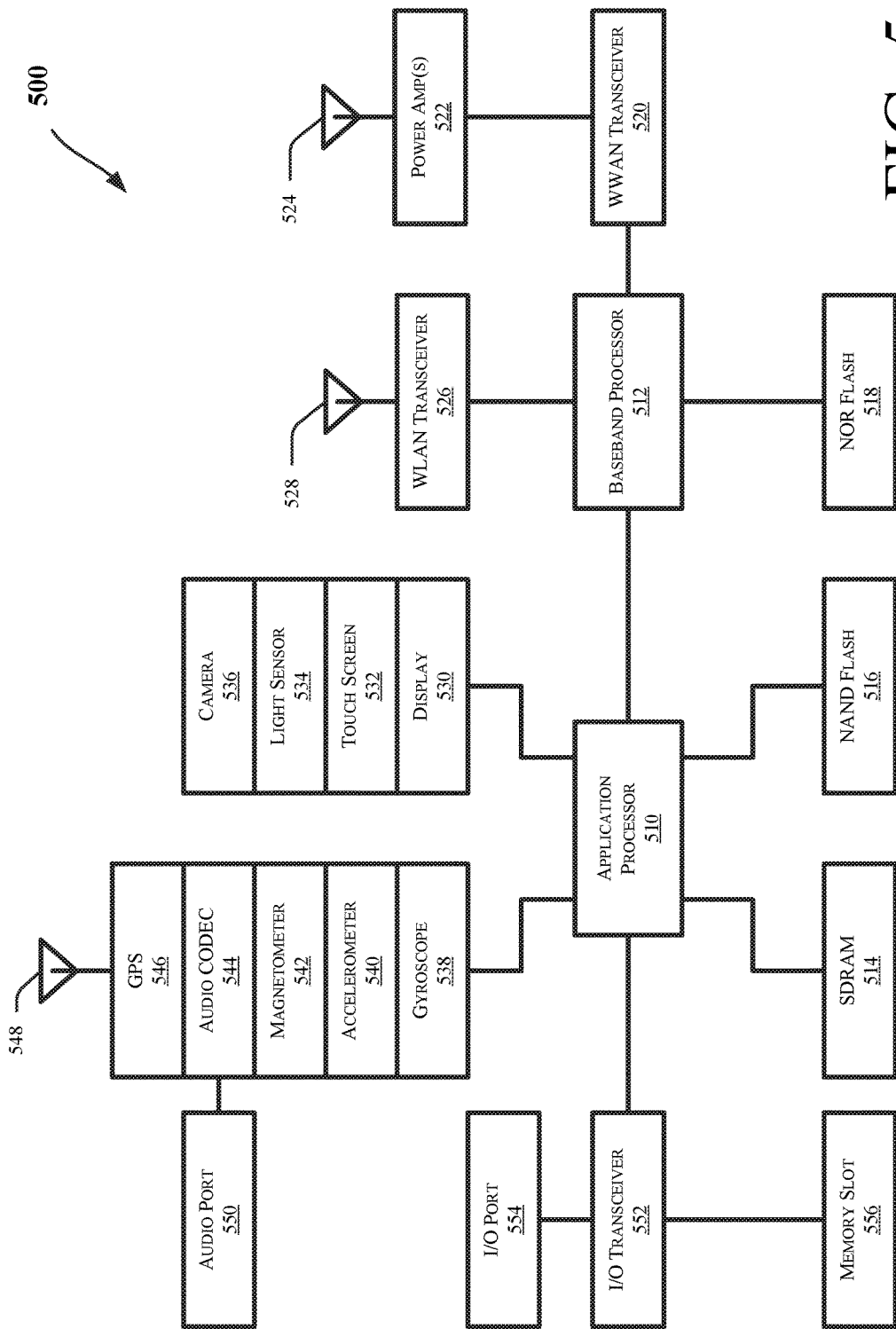
FIG. 5 is a schematic, block diagram illustration of an information-handling system in accordance with one or more exemplary embodiments disclosed herein.

Referring now to FIG. 5, a block diagram of an information handling system capable of user equipment controlled mobility in an evolved radio access network in accordance with one or more embodiments will be discussed. Information handling system 500 of FIG. 5 may tangibly embody any one or more of the network elements described herein, above, including for example the elements of network 100 with greater or fewer components depending on the hardware specifications of the particular device. In one embodiment, information handling system 500 may tangibly embody a user equipment (UE) comprising circuitry to enter into an evolved universal mobile telecommunications system (UMTS) terrestrial radio access (E-UTRAN) Routing Area Paging Channel (ERA_PCH) state, wherein the UE is configured with an E-UTRAN Routing Area (ERA) comprising a collection of cell identifiers, and an Anchor identifier (Anchor ID) to identify an anchor evolved Node B (eNB) for the UE, select to a new cell without performing a handover procedure, and perform a cell update procedure in response to the UE selecting to the new cell, although the scope of the claimed subject matter is not limited in this respect. In another embodiment, information handling system 500 may tangibly embody a user equipment (UE) comprising circuitry to enter into a Cell Update Connected (CU_CNCTD) state, wherein the UE is configured with an Anchor identifier (Anchor ID) to identify an anchor evolved Node B (eNB) for the UE, select to a new cell, perform a cell update procedure in response to the UE selecting to the new cell, perform a buffer request procedure in response to the UE selecting to the new cell, and perform a cell update procedure to download buffered data and to perform data transmission with the new cell, although the scope of the claimed subject matter is not limited in this respect. Although information handling system 500 represents one example of several types of computing platforms, information handling system 500 may include more or fewer elements and/or different arrangements of elements than shown in FIG. 5, and the scope of the claimed subject matter is not limited in these respects.

In one or more embodiments, information handling system 500 may include an application processor 510 and a baseband processor 512. Application processor 510 may be utilized as a general-purpose processor to run applications and the various subsystems for information handling system 500. Application processor 510 may include a single core or alternatively may include multiple processing cores. One or more of the cores may comprise a digital signal processor or digital signal processing (DSP) core. Furthermore, application processor 510 may include a graphics processor or coprocessor disposed on the same chip, or alternatively a graphics processor coupled to application processor 510 may comprise a separate, discrete graphics chip. Application processor 510 may include on board memory such as cache memory, and further may be coupled to external memory devices such as synchronous dynamic random access memory (SDRAM) 514 for storing and/or executing applications during operation, and NAND flash 516 for storing applications and/or data even when information handling system 500 is powered off. In one or more embodiments, instructions to operate or configure the information handling system 500 and/or any of its components or subsystems to operate in a manner as described herein may be stored on an article of manufacture comprising a (e.g., non-transitory) storage medium. In one or more embodiments, the storage medium may comprise any of the memory devices shown in and described herein, although the scope of the claimed subject matter is not limited in this respect. Baseband processor 512 may control the broadband radio functions for information handling system 500. Baseband processor 512 may store code for controlling such broadband radio functions in a NOR flash 518. Baseband processor 512 controls a wireless wide area network (WWAN) transceiver 520 which is used for modulating and/or demodulating broadband network signals, for example for communicating via a 3GPP LTE or LTE-Advanced network or the like.

In general, WWAN transceiver 520 may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 6 (3rd Generation Partnership Project Release 12), 3GPP Rel. 7 (3rd Generation Partnership Project Release 12), 3GPP LTE Extra, LTE Licensed-Assisted Access (LAA), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, millimeter wave (mmWave) standards in general for wireless systems operating at 10-90 GHz and above such as WiGig, IEEE 802.11ad, IEEE 802.11ay, and so on, and/or general telemetry transceivers, and in general any type of RF circuit or RFI sensitive circuit. It should be noted that such standards may evolve over time, and/or new standards may be promulgated, and the scope of the claimed subject matter is not limited in this respect.

The WWAN transceiver 520 couples to one or more power amps 542 respectively coupled to one or more antennas 524 for sending and receiving radio-frequency signals via the WWAN broadband network. The baseband processor 512 also may control a wireless local area network (WLAN) transceiver 526 coupled to one or more suitable antennas 528 and which may be capable of communicating via a Wi-Fi, Bluetooth®, and/or an amplitude modulation (AM) or frequency modulation (FM) radio standard including an IEEE 802.11 a/b/g/n/ac standard or the like. It should be noted that these are merely example implementations for application processor 510 and baseband processor 512, and the scope of the claimed subject matter is not limited in these respects. For example, any one or more of SDRAM 514, NAND flash 516 and/or NOR flash 518 may comprise other types of memory technology such as magnetic memory, chalcogenide memory, phase change memory, or ovonic memory, and the scope of the claimed subject matter is not limited in this respect.

In one or more embodiments, application processor 510 may drive a display 530 for displaying various information or data, and may further receive touch input from a user via a touch screen 532 for example via a finger or a stylus. An ambient light sensor 534 may be utilized to detect an amount of ambient light in which information handling system 500 is operating, for example to control a brightness or contrast value for display 530 as a function of the intensity of ambient light detected by ambient light sensor 534. One or more cameras 536 may be utilized to capture images that are processed by application processor 510 and/or at least temporarily stored in NAND flash 516. Furthermore, application processor may couple to a gyroscope 538, accelerometer 540, magnetometer 542, audio coder/decoder (CODEC) 544, and/or global positioning system (GPS) controller 546 coupled to an appropriate GPS antenna 548, for detection of various environmental properties including location, movement, and/or orientation of information handling system 500. Alternatively, controller 546 may comprise a Global Navigation Satellite System (GNSS) controller. Audio CODEC 544 may be coupled to one or more audio ports 550 to provide microphone input and speaker outputs either via internal devices and/or via external devices coupled to information handling system via the audio ports 550, for example via a headphone and microphone jack. In addition, application processor 510 may couple to one or more input/output (I/O) transceivers 552 to couple to one or more I/O ports 554 such as a universal serial bus (USB) port, a high-definition multimedia interface (HDMI) port, a serial port, and so on. Furthermore, one or more of the I/O transceivers 552 may couple to one or more memory slots 556 for optional removable memory such as secure digital (SD) card or a subscriber identity module (SIM) card, although the scope of the claimed subject matter is not limited in these respects.

Figure 6:
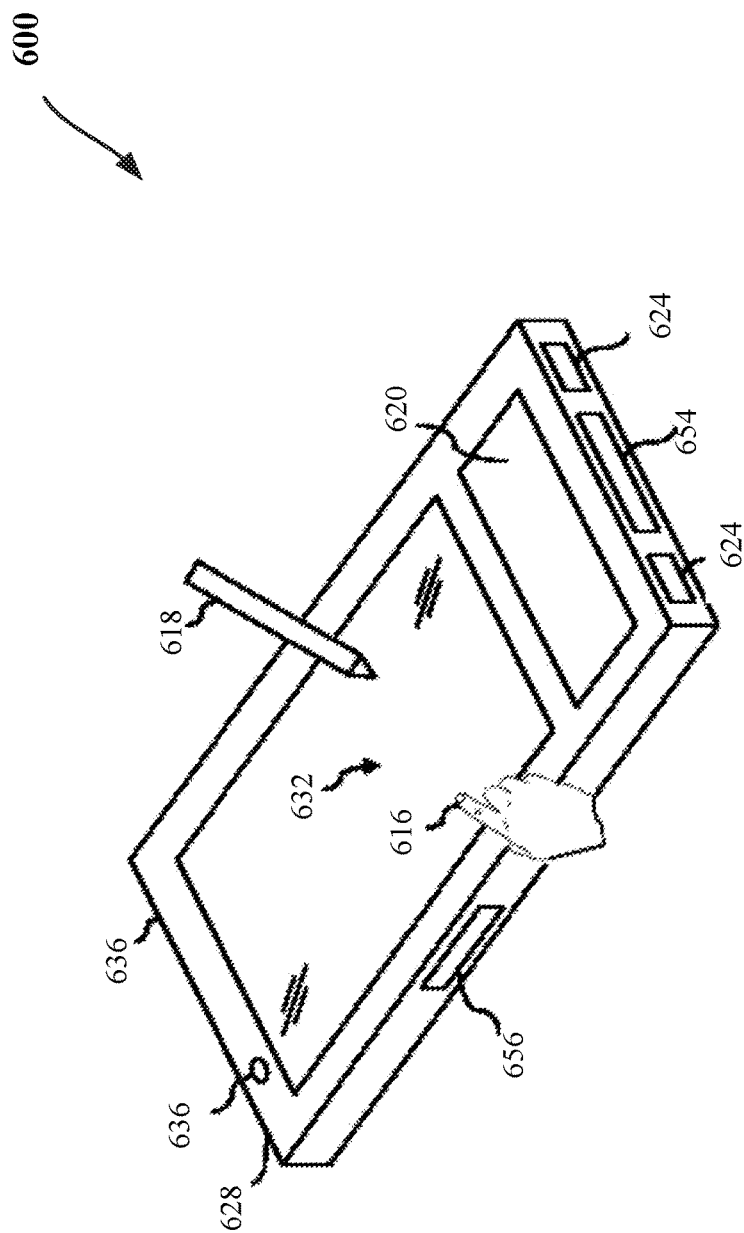
FIG. 6 is an isometric view of an exemplary embodiment of the information-handling system of FIG. 5 that optionally may include a touch screen in accordance with one or more embodiments disclosed herein.

Referring now to FIG. 6, an isometric view of an information handling system of FIG. 5 that optionally may include a touch screen in accordance with one or more embodiments will be discussed. FIG. 6 shows an example implementation of information handling system 500 of FIG. 5 tangibly embodied as a cellular telephone, smartphone, or tablet type device or the like. The information handling system 500 may comprise a housing 610 having a display 530 which may include a touch screen 532 for receiving tactile input control and commands via a finger 616 of a user and/or a via stylus 618 to control one or more application processors 510. The housing 610 may house one or more components of information handling system 500, for example one or more application processors 510, one or more of SDRAM 514, NAND flash 516, NOR flash 518, baseband processor 512, and/or WWAN transceiver 520. The information handling system 500 further may optionally include a physical actuator area 620 which may comprise a keyboard or buttons for controlling information handling system via one or more buttons or switches. The information handling system 500 may also include a memory port or slot 556 for receiving non-volatile memory such as flash memory, for example in the form of a secure digital (SD) card or a subscriber identity module (SIM) card. Optionally, the information handling system 500 may further include one or more speakers and/or microphones 624 and a connection port 554 for connecting the information handling system 500 to another electronic device, dock, display, battery charger, and so on. In addition, information handling system 500 may include a headphone or speaker jack 628 and one or more cameras 536 on one or more sides of the housing 610. It should be noted that the information handling system 500 of FIG. 6 may include more or fewer elements than shown, in various arrangements, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 7:
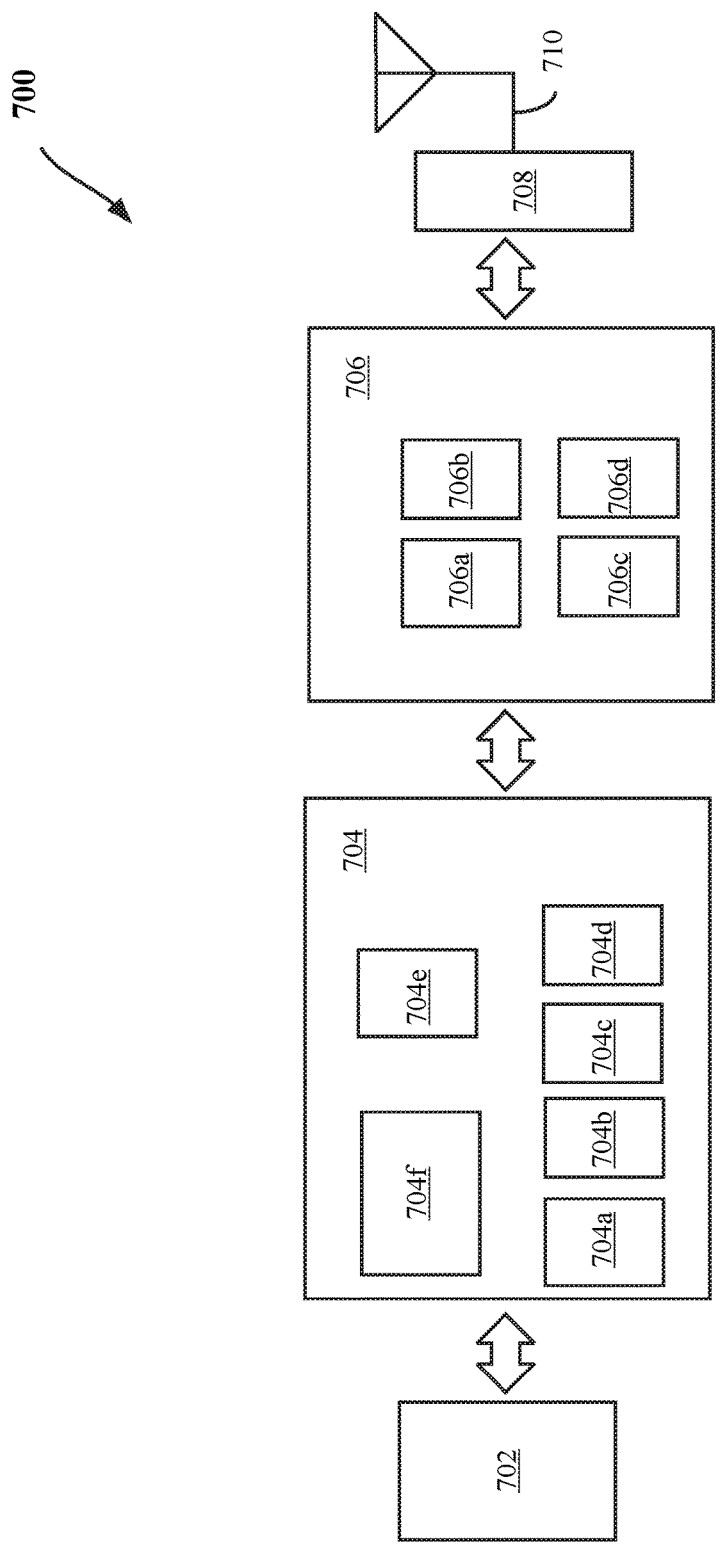
FIG. 7 is a schematic, block diagram illustration of components of a wireless device in accordance with one or more exemplary embodiments disclosed herein.

Referring now to FIG. 7, example components of a wireless device such as User Equipment (UE) device 110 in accordance with one or more embodiments will be discussed. In accordance with one embodiment, an eNB can include one or more components illustrated in and/or discussed with reference to FIG. 7. User equipment (UE) may correspond, for example, to UE 110 of network 100, although the scope of the claimed subject matter is not limited in this respect. In some embodiments, UE device 700 may include application circuitry 702, baseband circuitry 704, Radio Frequency (RF) circuitry 706, front-end module (FEM) circuitry 708 and one or more antennas 710, coupled together at least as shown.

Application circuitry 702 may include one or more application processors. For example, application circuitry 702 may include circuitry such as, but not limited to, one or more single-core or multi-core processors. The one or more processors may include any combination of general-purpose processors and dedicated processors, for example graphics processors, application processors, and so on. The processors may be coupled with and/or may include memory and/or storage and may be configured to execute instructions stored in the memory and/or storage to enable various applications and/or operating systems to run on the system.

Baseband circuitry 704 may include circuitry such as, but not limited to, one or more single-core or multi-core processors. Baseband circuitry 704 may include one or more baseband processors and/or control logic to process baseband signals received from a receive signal path of RF circuitry 706 and to generate baseband signals for a transmit signal path of the RF circuitry 706. Baseband processing circuity 704 may interface with the application circuitry 702 for generation and processing of the baseband signals and for controlling operations of the RF circuitry 706. For example, in some embodiments, the baseband circuitry 504 may include a second generation (2G) baseband processor 704a, third generation (3G) baseband processor 704b, fourth generation (4G) baseband processor 704c, and/or one or more other baseband processors 704d for other existing generations, generations in development or to be developed in the future, for example fifth generation (5G), sixth generation (6G), and so on. Baseband circuitry 704, for example one or more of baseband processors 704a through 704d, may handle various radio control functions that enable communication with one or more radio networks via RF circuitry 706. The radio control functions may include, but are not limited to, signal modulation and/or demodulation, encoding and/or decoding, radio frequency shifting, and so on. In some embodiments, modulation and/or demodulation circuitry of baseband circuitry 704 may include Fast-Fourier Transform (FFT), preceding, and/or constellation mapping and/or demapping functionality. In some embodiments, encoding and/or decoding circuitry of baseband circuitry 504 may include convolution, tail-biting convolution, turbo, Viterbi, and/or Low Density Parity Check (LDPC) encoder and/or decoder functionality. Embodiments of modulation and/or demodulation and encoder and/or decoder functionality are not limited to these examples and may include other suitable functionality in other embodiments.

In some embodiments, baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or Radio Resource Control (RRC) elements. Processor 704e of the baseband circuitry 704 may be configured to run elements of the protocol stack for signaling of the PHY, MAC, RLC, PDCP and/or RRC layers. In some embodiments, the baseband circuitry may include one or more audio digital signal processors (DSP) 704f. The one or more audio DSPs 704f may include elements for compression and/or decompression and/or echo cancellation and may include other suitable processing elements in other embodiments. Components of the baseband circuitry may be suitably combined in a single chip, a single chipset, or disposed on a same circuit board in some embodiments. In some embodiments, some or all of the constituent components of baseband circuitry 704 and application circuitry 702 may be implemented together such as, for example, on a system on a chip (SOC).

In some embodiments, baseband circuitry 704 may provide for communication compatible with one or more radio technologies. For example, in some embodiments, baseband circuitry 704 may support communication with an evolved universal terrestrial radio access network (EUTRAN) and/or other wireless metropolitan area networks (WMAN), a wireless local area network (WLAN), a wireless personal area network (WPAN). Embodiments in which baseband circuitry 504 is configured to support radio communications of more than one wireless protocol may be referred to as multi-mode baseband circuitry.

RF circuitry 706 may enable communication with wireless networks using modulated electromagnetic radiation through a non-solid medium. In various embodiments, RF circuitry 706 may include switches, filters, amplifiers, and so on, to facilitate the communication with the wireless network. RF circuitry 706 may include a receive signal path which may include circuitry to down-convert RF signals received from FEM circuitry 708 and provide baseband signals to baseband circuitry 704. RF circuitry 706 may also include a transmit signal path which may include circuitry to up-convert baseband signals provided by the baseband circuitry 704 and provide RF output signals to FEM circuitry 708 for transmission.

In some embodiments, RF circuitry 706 may include a receive signal path and a transmit signal path. The receive signal path of RF circuitry 706 may include mixer circuitry 706a, amplifier circuitry 706b and filter circuitry 706c. The transmit signal path of RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from FEM circuitry 708 based on the synthesized frequency provided by synthesizer circuitry 706d. Amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, mixer circuitry 706a of the transmit signal path may be configured to up-convert input baseband signals based on the synthesized frequency provided by synthesizer circuitry 706d to generate RF output signals for FEM circuitry 708. The baseband signals may be provided by the baseband circuitry 704 and may be filtered by filter circuitry 706c. Filter circuitry 706c may include a low-pass filter (LPF), although the scope of the embodiments is not limited in this respect.

In some embodiments, mixer circuitry 706a of the receive signal path and the mixer circuitry 706a of the transmit signal path may include two or more mixers and may be arranged for quadrature down conversion and/or up conversion respectively. In some embodiments, mixer circuitry 706a of the receive signal path and the mixer circuitry 706a of the transmit signal path may include two or more mixers and may be arranged for image rejection, for example Hartley image rejection. In some embodiments, mixer circuitry 506a of the receive signal path and the mixer circuitry 706a may be arranged for direct down conversion and/or direct up conversion, respectively. In some embodiments, mixer circuitry 706a of the receive signal path and mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, RF circuitry 706 may include analog-to-digital converter (ADC) and digital-to-analog converter (DAC) circuitry, and baseband circuitry 504 may include a digital baseband interface to communicate with RF circuitry 706. In some dual-mode embodiments, separate radio integrated circuit (IC) circuitry may be provided for processing signals for one or more spectra, although the scope of the embodiments is not limited in this respect.

In some embodiments, synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

Synthesizer circuitry 706d may be configured to synthesize an output frequency for use by mixer circuitry 706a of RF circuitry 706 based on a frequency input and a divider control input. In some embodiments, synthesizer circuitry 706*d* may be a fractional N/N+1 synthesizer.

In some embodiments, frequency input may be provided by a voltage controlled oscillator (VCO), although that is not a requirement. Divider control input may be provided by either baseband circuitry 704 or applications processor 702 depending on the desired output frequency. In some embodiments, a divider control input (e.g., N) may be determined from a look-up table based on a channel indicated by applications processor 702.

Synthesizer circuitry 706*d* of RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1, for example based on a carry out, to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706*d* may be configured to generate a carrier frequency as the output frequency, while in other embodiments, the output frequency may be a multiple of the carrier frequency, for example twice the carrier frequency, four times the carrier frequency, and so on, and used in conjunction with quadrature generator and divider circuitry to generate multiple signals at the carrier frequency with multiple different phases with respect to each other. In some embodiments, the output frequency may be a local oscillator (LO) frequency (fLO). In some embodiments, RF circuitry 706 may include an in-phase and quadrature (IQ) and/or polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by RF circuitry 706 for transmission by one or more of the one or more antennas 710.

In some embodiments, FEM circuitry 708 may include a transmit/receive (TX/RX) switch to switch between transmit mode and receive mode operation. FEM circuitry 708 may include a receive signal path and a transmit signal path. The receive signal path of FEM circuitry 708 may include a low-noise amplifier (LNA) to amplify received RF signals and to provide the amplified received RF signals as an output, for example to RF circuitry 706. The transmit signal path of FEM circuitry 708 may include a power amplifier (PA) to amplify input RF signals, for example provided by RF circuitry 706, and one or more filters to generate RF signals for subsequent transmission, for example by one or more of antennas 710. In some embodiments, UE device 700 may include additional elements such as, for example, memory and/or storage, display, camera, sensor, and/or input/output (I/O) interface, although the scope of the claimed subject matter is not limited in this respect.

Furthermore, some embodiments may be applied in computing devices that include one or more processors (e.g., with one or more processor cores), such as those discussed with reference to FIGS. 1 to 13, including for example small form factor or mobile computing devices, e.g., an IoT device, M2M device, a smartphone, tablet, UMPC (Ultra-Mobile Personal Computer), laptop computer, Ultrabook™ computing device, wearable devices (such as a smart watch, smart glasses, etc.), 2 in 1 systems, etc. However, embodiments discussed herein are not limited to mobile computing devices and may be applied in any type of computing device, such as a work station, a server, a super computer, etc. Also, some embodiments are applied in computing devices that include a cooling fan as well as fanless computing devices.

In some embodiments, an IoT device may be utilized. An IoT device may include various components (such as one or more components discussed with reference to FIGS. 1 to 13). Also, one or more embodiments may utilize a computing cloud (or more generally a "cloud"). The computing cloud may include various types of computing devices (such as those discussed herein with reference to FIGS. 1 to 13). These devices may be in digital communication via a cellular communication channel, a computer network, and/or the Internet. Also, one or more of the components discussed herein can be embodied as a System On Chip (SOC) device.

Figure 8:
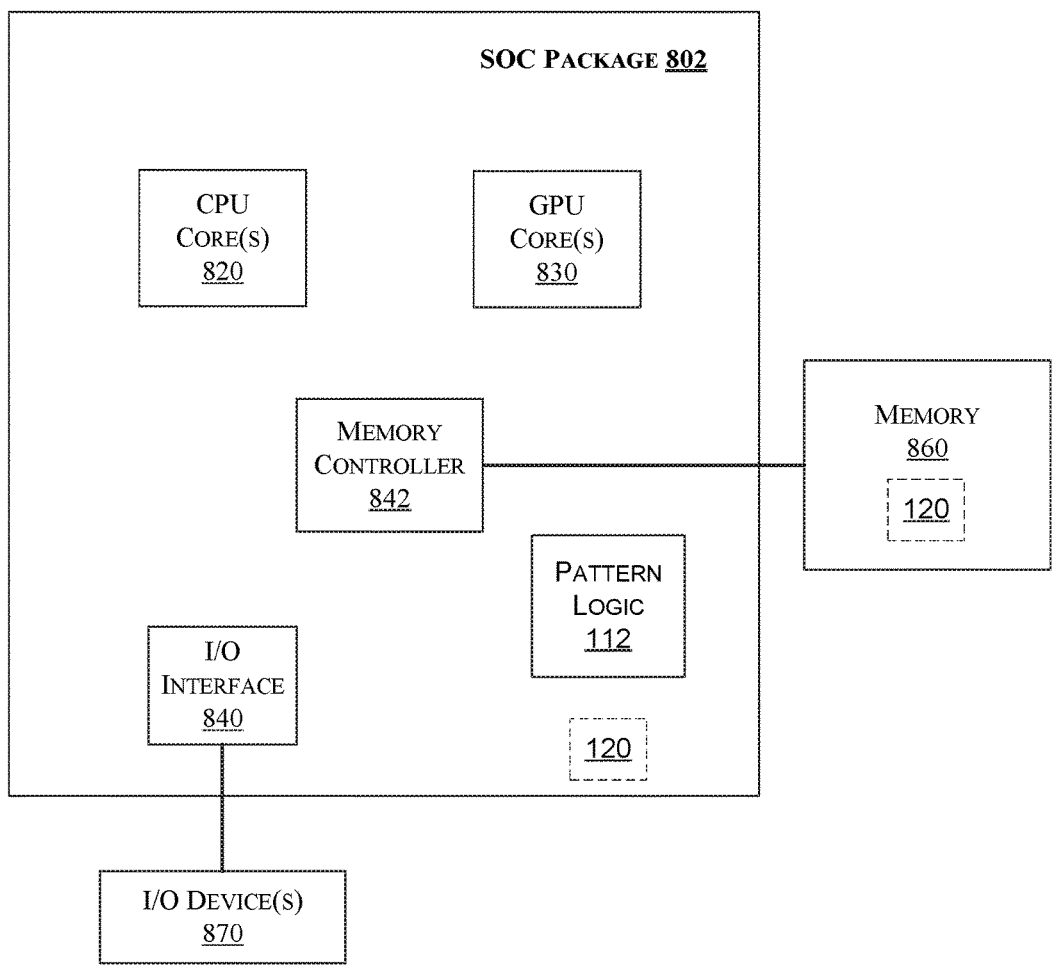
FIGS. 8 and 9 illustrates block diagrams of embodiments of computing systems, which may be utilized in various embodiments discussed herein.

FIG. 8 illustrates a block diagram of an SOC package in accordance with an embodiment. As illustrated in FIG. 8, SOC 802 includes one or more Central Processing Unit (CPU) cores 820, one or more Graphics Processor Unit (GPU) cores 830, an Input/Output (I/O) interface 840, and a memory controller 842. Various components of the SOC package 802 may be coupled to an interconnect or bus such as discussed herein with reference to the other figures. Also, the SOC package 802 may include more or less components, such as those discussed herein with reference to the other figures. Further, each component of the SOC package 820 may include one or more other components, e.g., as discussed with reference to the other figures herein. In one embodiment, SOC package 802 (and its components) is provided on one or more Integrated Circuit (IC) die, e.g., which are packaged into a single semiconductor device.

As illustrated in FIG. 8, SOC package 802 is coupled to a memory 860 via the memory controller 842. In an embodiment, the memory 860 (or a portion of it) can be integrated on the SOC package 802.

The I/O interface 840 may be coupled to one or more I/O devices 870, e.g., via an interconnect and/or bus such as discussed herein with reference to other figures. I/O device(s) 870 may include one or more of a keyboard, a mouse, a touchpad, a display, an image/video capture device (such as a camera or camcorder/video recorder), a touch screen, a speaker, or the like.

Figure 9:
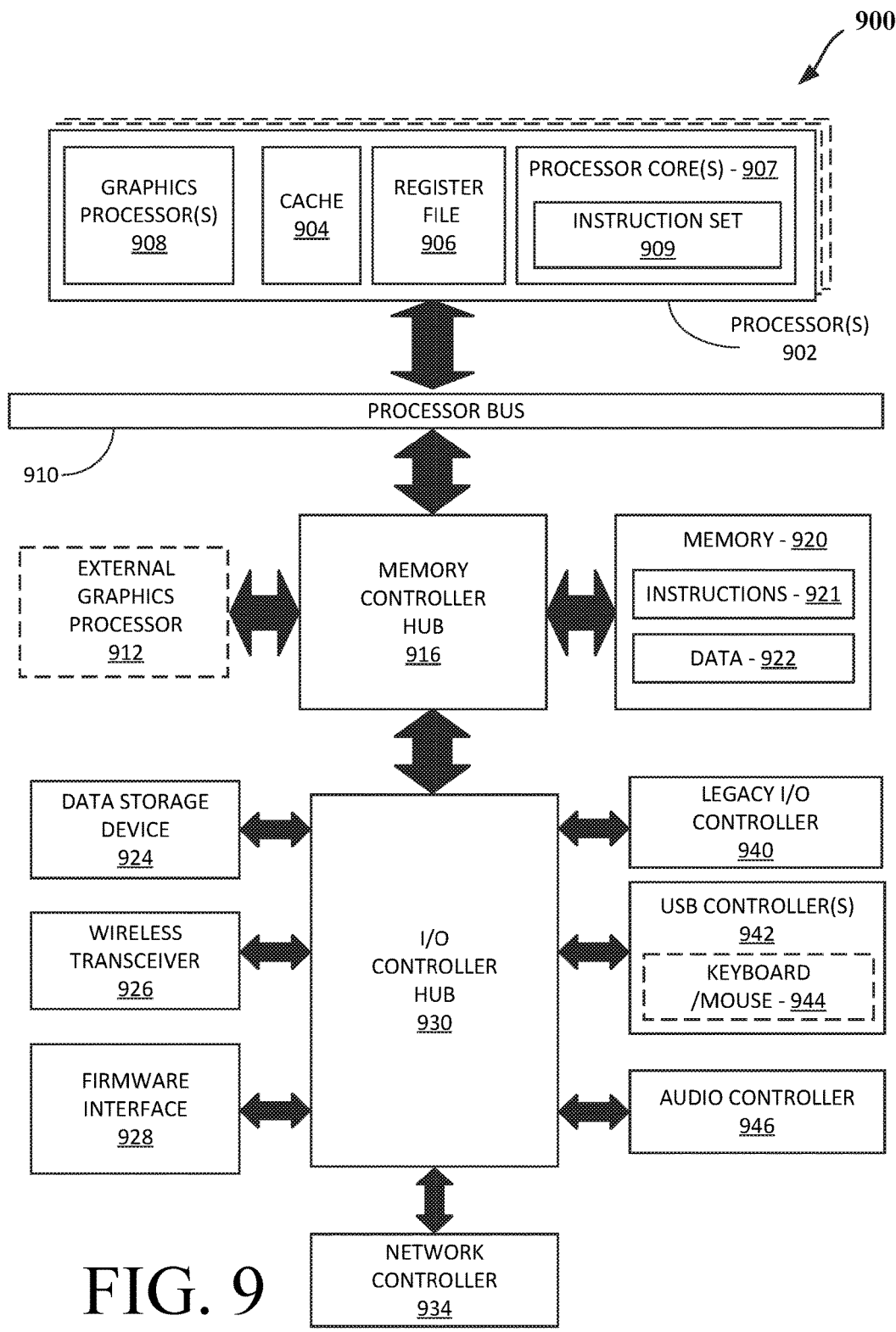

FIG. 9 is a block diagram of a processing system 900, according to an embodiment. In various embodiments the system 900 includes one or more processors 902 and one or more graphics processors 908, and may be a single processor desktop system, a multiprocessor workstation system, or a server system having a large number of processors 902 or processor cores 907. In on embodiment, the system 900 is a processing platform incorporated within a system-on-a-chip (SoC or SOC) integrated circuit for use in mobile, handheld, or embedded devices.

An embodiment of system 900 can include, or be incorporated within a server-based gaming platform, a game console, including a game and media console, a mobile gaming console, a handheld game console, or an online game console. In some embodiments system 900 is a mobile phone, smart phone, tablet computing device or mobile Internet device. Data processing system 900 can also include, couple with, or be integrated within a wearable device, such as a smart watch wearable device, smart eyewear device, augmented reality device, or virtual reality device. In some embodiments, data processing system 900 is a television or set top box device having one or more processors 902 and a graphical interface generated by one or more graphics processors 908.

In some embodiments, the one or more processors 902 each include one or more processor cores 907 to process instructions which, when executed, perform operations for system and user software. In some embodiments, each of the one or more processor cores 907 is configured to process a specific instruction set 909. In some embodiments, instruction set 909 may facilitate Complex Instruction Set Computing (CISC), Reduced Instruction Set Computing (RISC), or computing via a Very Long Instruction Word (VLIW). Multiple processor cores 907 may each process a different instruction set 909, which may include instructions to facilitate the emulation of other instruction sets. Processor core 907 may also include other processing devices, such a Digital Signal Processor (DSP).

In some embodiments, the processor 902 includes cache memory 904. Depending on the architecture, the processor 902 can have a single internal cache or multiple levels of internal cache. In some embodiments, the cache memory is shared among various components of the processor 902. In some embodiments, the processor 902 also uses an external cache (e.g., a Level-3 (L3) cache or Last Level Cache (LLC)) (not shown), which may be shared among processor cores 907 using known cache coherency techniques. A register file 906 is additionally included in processor 902 which may include different types of registers for storing different types of data (e.g., integer registers, floating point registers, status registers, and an instruction pointer register). Some registers may be general-purpose registers, while other registers may be specific to the design of the processor 902.

In some embodiments, processor 902 is coupled to a processor bus 910 to transmit communication signals such as address, data, or control signals between processor 902 and other components in system 900. In one embodiment the system 900 uses an exemplary 'hub' system architecture, including a memory controller hub 916 and an Input Output (I/O) controller hub 930. A memory controller hub 916 facilitates communication between a memory device and other components of system 900, while an I/O Controller Hub (ICH) 930 provides connections to I/O devices via a local I/O bus. In one embodiment, the logic of the memory controller hub 916 is integrated within the processor.

Memory device 920 can be a dynamic random access memory (DRAM) device, a static random access memory (SRAM) device, flash memory device, phase-change memory device, or some other memory device having suitable performance to serve as process memory. In one embodiment the memory device 920 can operate as system memory for the system 900, to store data 922 and instructions 921 for use when the one or more processors 902 executes an application or process. Memory controller hub 916 also couples with an optional external graphics processor 912, which may communicate with the one or more graphics processors 908 in processors 902 to perform graphics and media operations.

In some embodiments, ICH 930 enables peripherals to connect to memory device 920 and processor 902 via a high-speed I/O bus. The I/O peripherals include, but are not limited to, an audio controller 946, a firmware interface 928, a wireless transceiver 926 (e.g., Wi-Fi, Bluetooth), a data storage device 924 (e.g., hard disk drive, flash memory, etc.), and a legacy I/O controller 940 for coupling legacy (e.g., Personal System 2 (PS/2)) devices to the system. One or more Universal Serial Bus (USB) controllers 942 connect input devices, such as keyboard and mouse 944 combinations. A network controller 934 may also couple to ICH 930. In some embodiments, a high-performance network controller (not shown) couples to processor bus 910. It will be appreciated that the system 900 shown is exemplary and not limiting, as other types of data processing systems that are differently configured may also be used. For example, the I/O controller hub 930 may be integrated within the one or more processor 902, or the memory controller hub 916 and I/O controller hub 930 may be integrated into a discreet external graphics processor, such as the external graphics processor 912.

Figure 10:
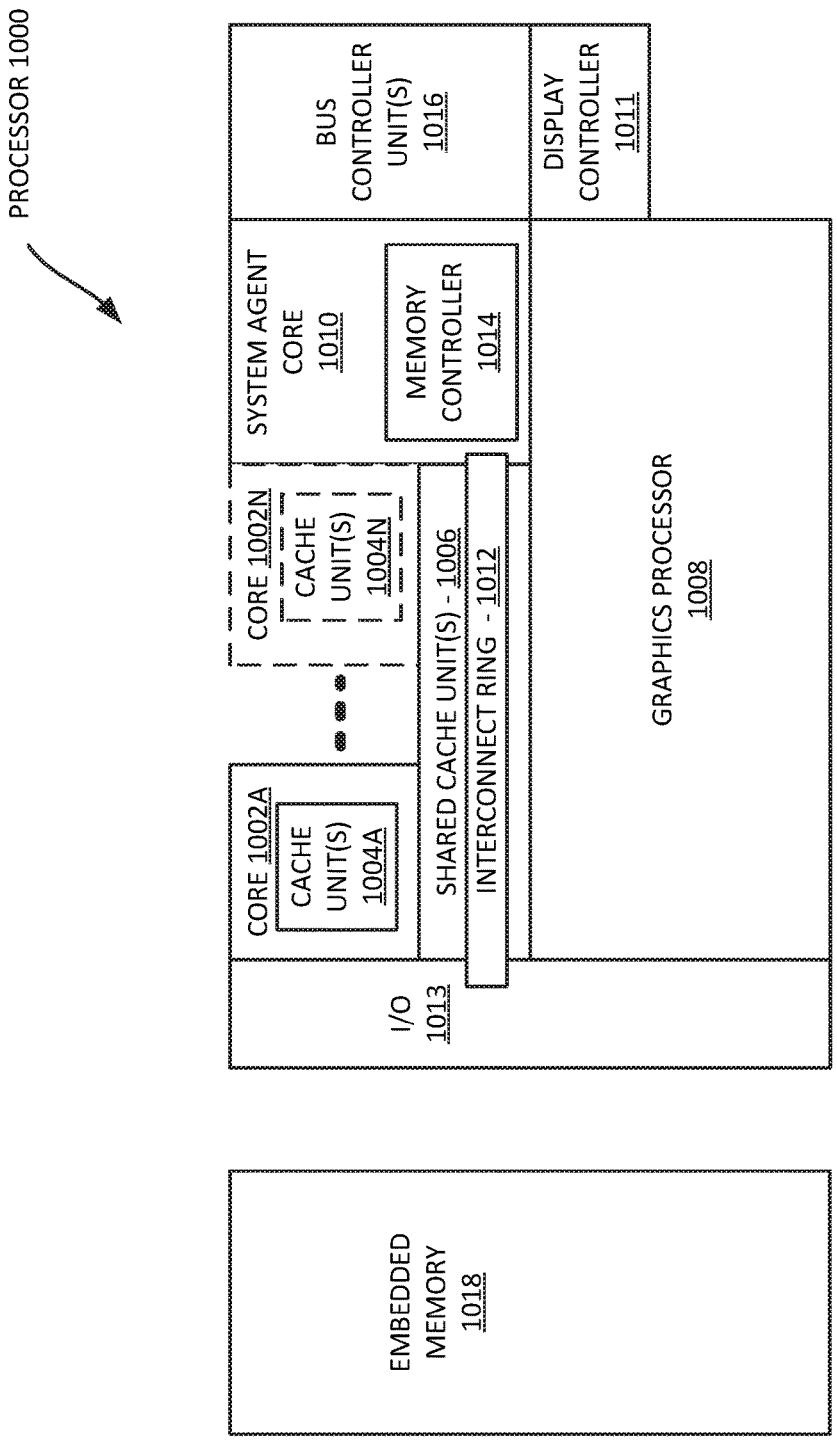
FIGS. 10 and 11 illustrate various components of processers in accordance with some embodiments.

FIG. 10 is a block diagram of an embodiment of a processor 1000 having one or more processor cores 1002A to 1002N, an integrated memory controller 1014, and an integrated graphics processor 1008. Those elements of FIG. 10 having the same reference numbers (or names) as the elements of any other figure herein can operate or function in any manner similar to that described elsewhere herein, but are not limited to such. Processor 1000 can include additional cores up to and including additional core 1002N represented by the dashed lined boxes. Each of processor cores 1002A to 1002N includes one or more internal cache units 1004A to 1004N. In some embodiments each processor core also has access to one or more shared cached units 1006.

The internal cache units 1004A to 1004N and shared cache units 1006 represent a cache memory hierarchy within the processor 1000. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 1006 and 1004A to 1004N.

In some embodiments, processor 1000 may also include a set of one or more bus controller units 1016 and a system agent core 1010. The one or more bus controller units 1016 manage a set of peripheral buses, such as one or more Peripheral Component Interconnect buses (e.g., PCI, PCI Express). System agent core 1010 provides management functionality for the various processor components. In some embodiments, system agent core 1010 includes one or more integrated memory controllers 1014 to manage access to various external memory devices (not shown).

In some embodiments, one or more of the processor cores 1002A to 1002N include support for simultaneous multi-threading. In such embodiment, the system agent core 1010 includes components for coordinating and operating cores 1002A to 1002N during multi-threaded processing. System agent core 1010 may additionally include a power control unit (PCU), which includes logic and components to regulate the power state of processor cores 1002A to 1002N and graphics processor 1008.

In some embodiments, processor 1000 additionally includes graphics processor 1008 to execute graphics processing operations. In some embodiments, the graphics processor 1008 couples with the set of shared cache units 1006, and the system agent core 1010, including the one or more integrated memory controllers 1014. In some embodiments, a display controller 1011 is coupled with the graphics processor 1008 to drive graphics processor output to one or more coupled displays. In some embodiments, display controller 1011 may be a separate module coupled with the graphics processor via at least one interconnect, or may be integrated within the graphics processor 1008 or system agent core 1010.

In some embodiments, a ring based interconnect unit 1012 is used to couple the internal components of the processor 1000. However, an alternative interconnect unit may be used, such as a point-to-point interconnect, a switched interconnect, or other techniques, including techniques well known in the art. In some embodiments, graphics processor 1008 couples with the ring interconnect 1012 via an I/O link 1013.

The exemplary I/O link 1013 represents at least one of multiple varieties of I/O interconnects, including an on package I/O interconnect which facilitates communication between various processor components and a high-performance embedded memory module 1018, such as an eDRAM (or embedded DRAM) module. In some embodiments, each of the processor cores 1002 to 1002N and graphics processor 1008 use embedded memory modules 1018 as a shared Last Level Cache.

In some embodiments, processor cores 1002A to 1002N are homogenous cores executing the same instruction set architecture. In another embodiment, processor cores 1002A to 1002N are heterogeneous in terms of instruction set architecture (ISA), where one or more of processor cores 1002A to 1002N execute a first instruction set, while at least one of the other cores executes a subset of the first instruction set or a different instruction set. In one embodiment processor cores 1002A to 1002N are heterogeneous in terms of microarchitecture, where one or more cores having a relatively higher power consumption couple with one or more power cores having a lower power consumption. Additionally, processor 1000 can be implemented on one or more chips or as an SoC integrated circuit having the illustrated components, in addition to other components.

Figure 11:
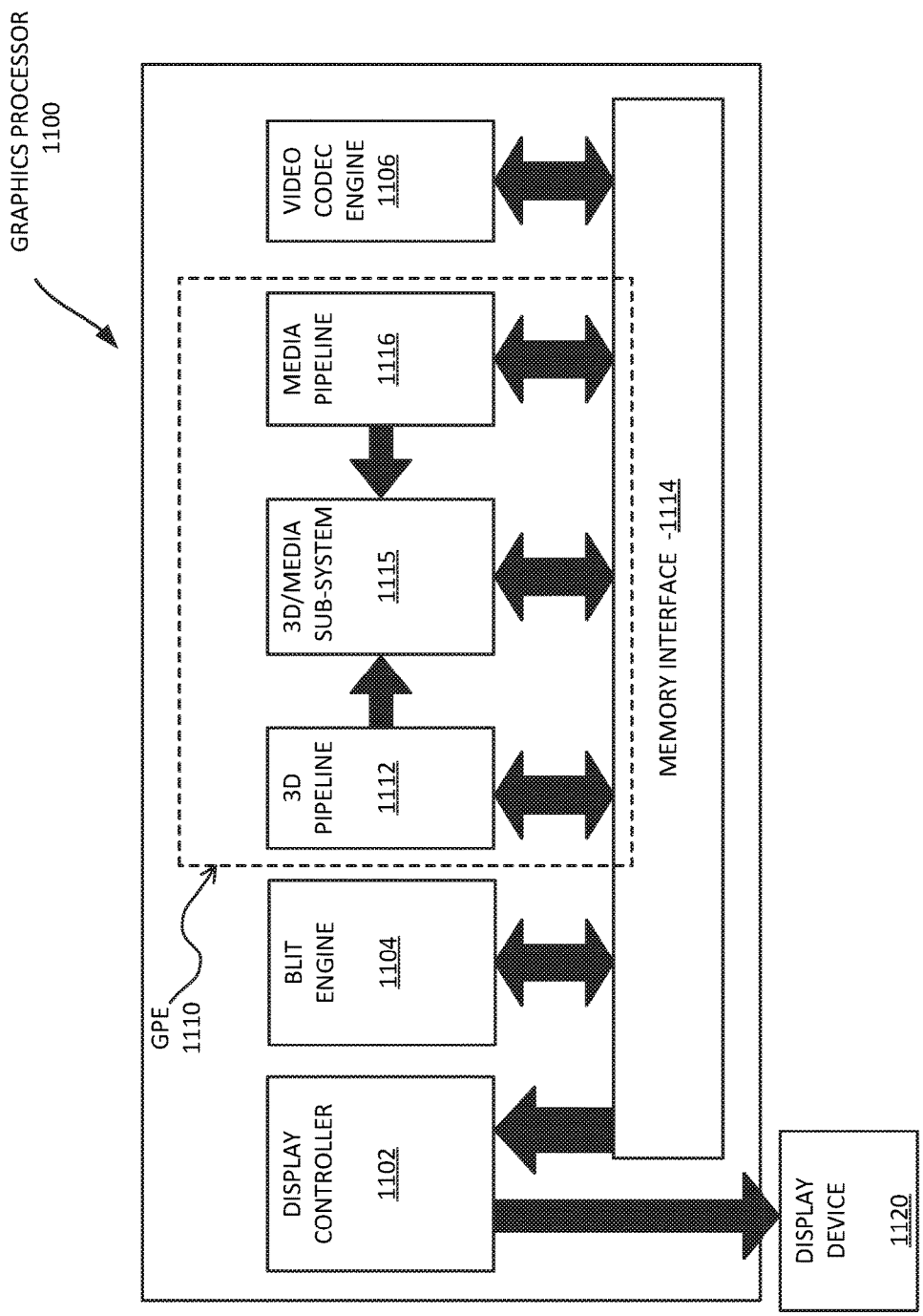

FIG. 11 is a block diagram of a graphics processor 1100, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1100 includes a memory interface 1114 to access memory. Memory interface 1114 can be an interface to local memory, one or more internal caches, one or more shared external caches, and/or to system memory.

In some embodiments, graphics processor 1100 also includes a display controller 1102 to drive display output data to a display device 1120. Display controller 1102 includes hardware for one or more overlay planes for the display and composition of multiple layers of video or user interface elements. In some embodiments, graphics processor 1100 includes a video codec engine 1106 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 1100 includes a block image transfer (BLIT) engine 1104 to perform two-dimensional (2D) rasterizer operations including, for example, bit-boundary block transfers. However, in one embodiment, 11D graphics operations are performed using one or more components of graphics processing engine (GPE) 1110. In some embodiments, graphics processing engine 1110 is a compute engine for performing graphics operations, including three-dimensional (3D) graphics operations and media operations.

In some embodiments, GPE 1110 includes a 3D pipeline 1112 for performing 3D operations, such as rendering three-dimensional images and scenes using processing functions that act upon 3D primitive shapes (e.g., rectangle, triangle, etc.). The 3D pipeline 1112 includes programmable and fixed function elements that perform various tasks within the element and/or spawn execution threads to a 3D/Media sub-system 1115. While 3D pipeline 1112 can be used to perform media operations, an embodiment of GPE 1110 also includes a media pipeline 1116 that is specifically used to perform media operations, such as video post-processing and image enhancement.

In some embodiments, media pipeline 1116 includes fixed function or programmable logic units to perform one or more specialized media operations, such as video decode acceleration, video de-interlacing, and video encode acceleration in place of, or on behalf of video codec engine 1106. In some embodiments, media pipeline 1116 additionally includes a thread spawning unit to spawn threads for execution on 3D/Media sub-system 1115. The spawned threads perform computations for the media operations on one or more graphics execution units included in 3D/Media sub-system 1115.

In some embodiments, 3D/Media subsystem 1115 includes logic for executing threads spawned by 3D pipeline 1112 and media pipeline 1116. In one embodiment, the pipelines send thread execution requests to 3D/Media sub-system 1115, which includes thread dispatch logic for arbitrating and dispatching the various requests to available thread execution resources. The execution resources include an array of graphics execution units to process the 3D and media threads. In some embodiments, 3D/Media subsystem 1115 includes one or more internal caches for thread instructions and data. In some embodiments, the subsystem also includes shared memory, including registers and addressable memory, to share data between threads and to store output data.

Figure 12:
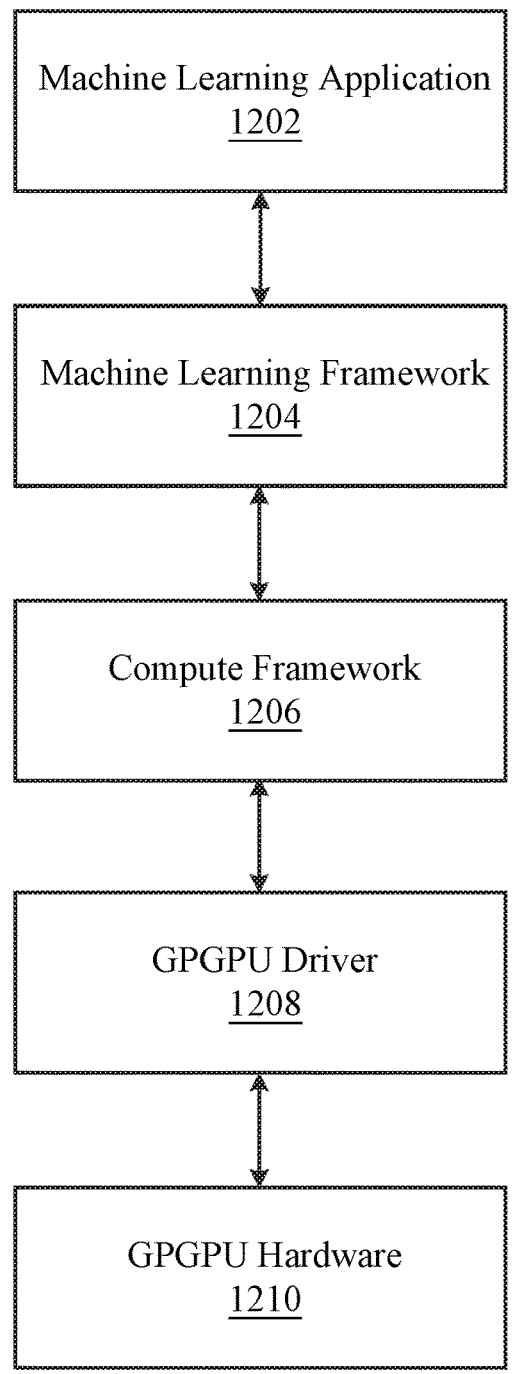
FIG. 12 illustrates a machine learning software stack, according to an embodiment.

FIG. 12 is a generalized diagram of a machine learning software stack 1200. A machine learning application 1202 can be configured to train a neural network or other similar supervised machine learning techniques using a training dataset or to use a trained deep neural network to implement machine intelligence. Moreover, while one or more embodiments are discussed herein with reference to heavy deep learning implementations, embodiments are not limited to such implementations and any supervised machine learning algorithm can be used, such as Bayesian Network (also referred to as Bayes Net), Random Forest, Logistic Regression, SVM (Support Vector Machine), Neural Network, Deep Neural Network, or any combinations thereof. The machine learning application 1202 can include training and inference functionality for a neural network and/or specialized software that can be used to train a neural network before deployment. The machine learning application 1202 can implement any type of machine intelligence including but not limited to image recognition, mapping and localization, autonomous navigation, speech synthesis, medical imaging, or language translation.

Hardware acceleration for the machine learning application 1202 can be enabled via a machine learning framework 1204. The machine learning framework 1204 can provide a library of machine learning primitives. Machine learning primitives are basic operations that are commonly performed by machine learning algorithms. Without the machine learning framework 1204, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 1204. Exemplary primitives include tensor convolutions, activation functions, and pooling, which are computational operations that are performed while training a convolutional neural network (CNN). The machine learning framework 1204 can also provide primitives to implement basic linear algebra subprograms performed by many machine-learning algorithms, such as matrix and vector operations.

The machine learning framework 1204 can process input data received from the machine learning application 1202 and generate the appropriate input to a compute framework 1206. The compute framework 1206 can abstract the underlying instructions provided to the GPGPU driver 1208 to enable the machine learning framework 1204 to take advantage of hardware acceleration via the GPGPU hardware 1210 without requiring the machine learning framework 1204 to have intimate knowledge of the architecture of the GPGPU hardware 1210. Additionally, the compute framework 1206 can enable hardware acceleration for the machine learning framework 1204 across a variety of types and generations of the GPGPU hardware 1210.

The computing architecture provided by embodiments described herein can be configured to perform the types of parallel processing that is particularly suited for training and deploying neural networks for machine learning. A neural network can be generalized as a network of functions having a graph relationship. As is known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described herein present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the neural network.

Figure 13:
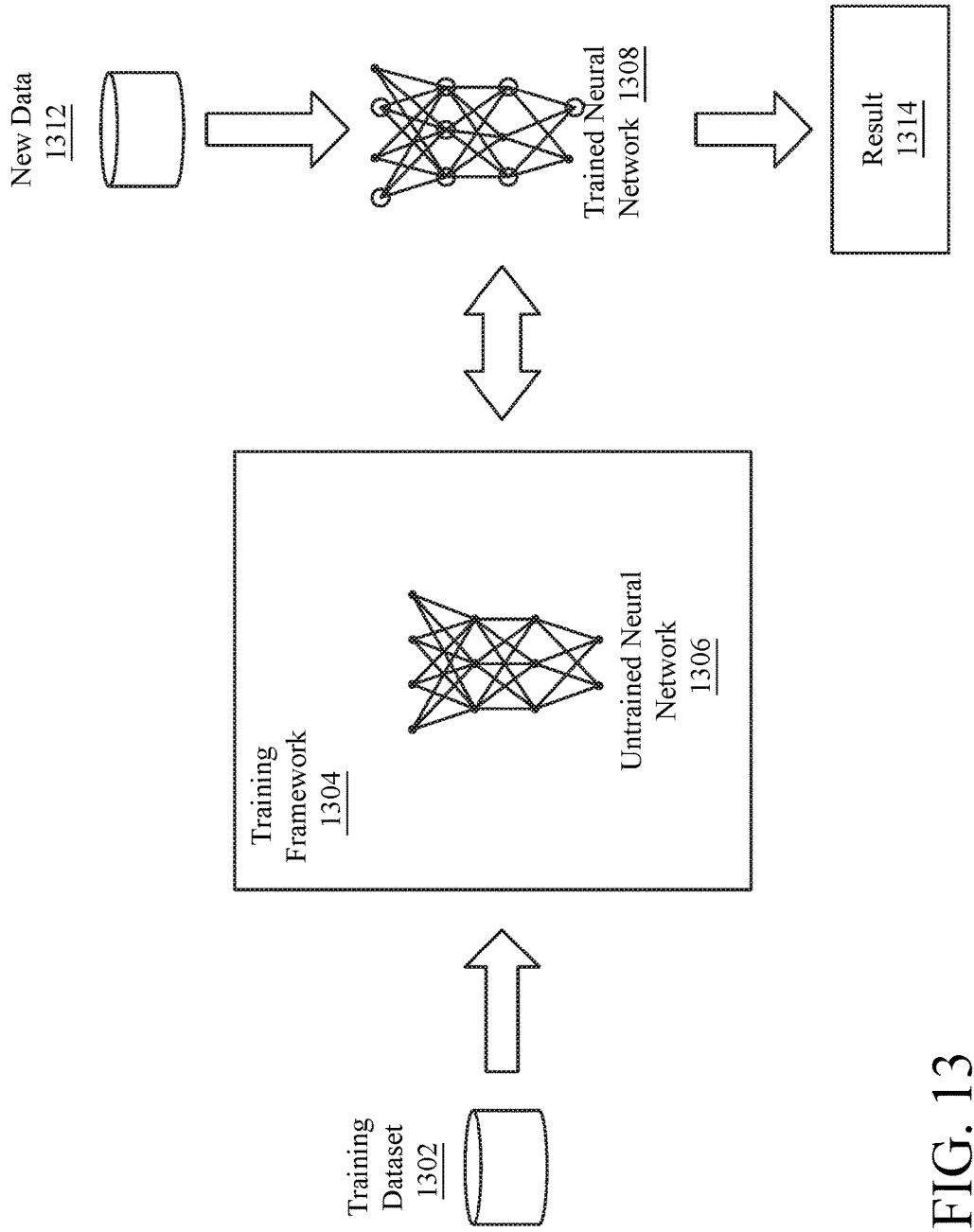
FIG. 13 illustrates training and deployment of a deep neural network.

FIG. 13 illustrates training and deployment of a deep neural network. Once a given network has been structured for a task the neural network is trained using a training dataset 1302. Various training frameworks have been developed to enable hardware acceleration of the training process.

For example, the machine learning framework 1204 of FIG. 12 may be configured as a training framework 1304. The training framework 1304 can hook into an untrained neural network 1306 and enable the untrained neural net to be trained using the parallel processing resources described herein to generate a trained neural network 1308. To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 1302 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 1304 can adjust to adjust the weights that control the untrained neural network 1306. The training framework 1304 can provide tools to monitor how well the untrained neural network 1306 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural network 1308. The trained neural network 1308 can then be deployed to implement any number of machine learning operations.

Unsupervised learning is a learning method in which the network attempts to train itself using unlabeled data. Thus, for unsupervised learning the training dataset 1302 will include input data without any associated output data. The untrained neural network 1306 can learn groupings within the unlabeled input and can determine how individual inputs are related to the overall dataset. Unsupervised training can be used to generate a self-organizing map, which is a type of trained neural network 1307 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 1302 includes a mix of labeled and unlabeled data of the same distribution. Incremental learning is a variant of supervised learning in which input data is continuously used to further train the model. Incremental learning enables the trained neural network 1308 to adapt to the new data 1312 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

The following examples pertain to further embodiments. Example 1 includes an apparatus comprising: collection logic to receive risk data from one or more source devices; and memory, coupled to the collection logic, to store the risk data, wherein pattern logic is to analyze the stored risk data to determine existence of one or more risks, wherein the risk data includes results of two-way ping signals communicated between the one or more source devices and a target device. Example 2 includes the apparatus of example 1, wherein the pattern logic is to determine existence of the one or more risks based at least in part on a rate of occurrence of successful two-way ping signals communicated between the one or more source devices and the target device. Example 3 includes the apparatus of example 1, comprising logic to generate a risk map of the one or more risks in a geographic area. Example 4 includes the apparatus of example 3, wherein the target device is to receive information corresponding to the risk map before entering or during presence in the geographic area. Example 5 includes the apparatus of example 3, wherein the geographic area comprises one or more of a parking lot, one or more street blocks, a factory floor, a warehouse, or a grocery store. Example 6 includes the apparatus of example 3, wherein logic to generate the risk map is to generate the risk map based at least in part on Global Positing System (GPS) information. Example 7 includes the apparatus of example 1, wherein the risk data includes the results of two-way ping signals communicated between the one or more source devices and the target device during a time period. Example 8 includes the apparatus of example 7, wherein the time period is about 100 millisecond. Example 9 includes the apparatus of example 1, wherein the one or more source devices comprise one or more communication devices proximate or coupled to at least one of: a vehicle, a stationary object, a pedestrian, a bicyclist, a skateboarder, or a pet, wherein the one or more communication devices are to communicate the risk data. Example 10 includes the apparatus of example 1, wherein the one or more source devices comprise one or more communication devices, wherein the one or more communication devices communicate in accordance with Third Generation Partnership Project (3GPP) Long Term Evolution (LTE), Fourth Generation (4G), or Fifth Generation (5G) cellular network signals. Example 11 includes the apparatus of example 1, wherein the one or more source devices comprise one or more communication devices, wherein the one or more communication devices communicate in accordance with millimeter Wave (mmWave) signals. Example 12 includes the apparatus of example 11, comprising logic to track movement of the target device or presence of an obstacle based at least in part on reflections in the mmWave signals. Example 13 includes the apparatus of example 11, comprising logic to track movement of the target device or presence of an obstacle based at least in part on machine learning or deep learning applied to the mmWave signals. Example 14 includes the apparatus of example 1, wherein the one or more source devices comprise one or more communication devices proximate or coupled to at least a stationary object, wherein the stationary object comprises one or more of: a camera and a proximity sensor. Example 15 includes the apparatus of example 1, wherein the one or more source devices comprise one or more communication devices proximate or coupled to at least a stationary object, wherein the stationary object is to communicate through wired or wireless communication. Example 16 includes the apparatus of example 1, wherein the one or more source devices comprise one or more communication devices, wherein the one or more communication devices comprise a smartphone, a Radio Frequency (RF) tag, or an Internet of Things (IoT) device. Example 17 includes the apparatus of example 1, wherein a central computing device comprises one or more of: the collection logic, the pattern logic, and the memory. Example 18 includes the apparatus of example 1, wherein at least one of the target device or the one or more source devices comprises one or more of: a processor having one or more processor cores, a Graphics Processing Unit (GPU) having one or more cores, a Field Programmable Gate Array (FPGA), the collection logic, the memory, and the pattern logic.

Example 19 includes one or more computer-readable medium comprising one or more instructions that when executed on at least one processor configure the at least one processor to perform one or more operations to cause: collection logic to receive risk data from one or more source devices; and memory to store the risk data, wherein pattern logic is to analyze the stored risk data to determine existence of one or more risks, wherein the risk data includes results of two-way ping signals communicated between the one or more source devices and a target device. Example 20 includes the computer-readable medium of example 19, further comprising one or more instructions that when executed on the at least one processor configure the at least one processor to perform one or more operations to cause the pattern logic to determine existence of the one or more risks based at least in part on a rate of occurrence of successful two-way ping signals communicated between the one or more source devices and the target device. Example 21 includes the computer-readable medium of example 19, further comprising one or more instructions that when executed on the at least one processor configure the at least one processor to perform one or more operations to generate a risk map of the one or more risks in a geographic area. Example 22 includes the computer-readable medium of example 19, wherein the risk data includes the results of two-way ping signals communicated between the one or more source devices and the target device during a time period.

Example 23 includes a computing system comprising: a processor having one or more processor cores; memory, coupled to the processor, to store one or more bits of data; and collection logic to receive risk data from one or more source devices; wherein the memory is to store the risk data, wherein pattern logic is to analyze the stored risk data to determine existence of one or more risks, wherein the risk data includes results of two-way ping signals communicated between the one or more source devices and a target device. Example 24 includes the system of example 23, wherein the pattern logic is to determine existence of the one or more risks based at least in part on a rate of occurrence of successful two-way ping signals communicated between the one or more source devices and the target device. Example 25 includes the system of example 23, comprising logic to generate a risk map of the one or more risks in a geographic area. Example 26 includes the system of example 23, wherein the risk data includes the results of two-way ping signals communicated between the one or more source devices and the target device during a time period. Example 27 includes the system of example 23, wherein the one or more source devices comprise one or more communication devices proximate or coupled to at least one of: a vehicle, a stationary object, a pedestrian, a bicyclist, a skateboarder, or a pet, wherein the one or more communication devices are to communicate the risk data. Example 28 includes the system of example 23, wherein the one or more source devices comprise one or more communication devices, wherein the one or more communication devices communicate in accordance with Third Generation Partnership Project (3GPP) Long Term Evolution (LTE), Fourth Generation (4G), or Fifth Generation (5G) cellular network signals. Example 29 includes the system of example 23, wherein the one or more source devices comprise one or more communication devices, wherein the one or more communication devices communicate in accordance with millimeter Wave (mmWave) signals. Example 30 includes the system of example 23, wherein the one or more source devices comprise one or more communication devices proximate or coupled to at least a stationary object, wherein the stationary object comprises one or more of: a camera and a proximity sensor. Example 31 includes the system of example 23, wherein the one or more source devices comprise one or more communication devices proximate or coupled to at least a stationary object, wherein the stationary object is to communicate through wired or wireless communication. Example 32 includes the system of example 23, wherein the one or more source devices comprise one or more communication devices, wherein the one or more communication devices comprise a smartphone, a Radio Frequency (RF) tag, or an Internet of Things (IoT) device. Example 33 includes the system of example 23, wherein a central computing device comprises one or more of: the collection logic, the pattern logic, and the memory. Example 34 includes the system of example 23, wherein at least one of the target device or the one or more source devices comprises one or more of: the processor having one or more processor cores, a Graphics Processing Unit (GPU) having one or more cores, a Field Programmable Gate Array (FPGA), the collection logic, the memory, and the pattern logic.

Example 35 includes a method comprising: receiving, at collection logic, risk data from one or more source devices; and storing the risk data in memory, wherein pattern logic analyzes the stored risk data to determine existence of one or more risks, wherein the risk data includes results of two-way ping signals communicated between the one or more source devices and a target device. Example 36 includes the method of example 35, further comprising the pattern logic determining existence of the one or more risks based at least in part on a rate of occurrence of successful two-way ping signals communicated between the one or more source devices and the target device. Example 37 includes the method of example 35, further comprising generating a risk map of the one or more risks in a geographic area. Example 38 includes the method of example 35, wherein the risk data includes the results of two-way ping signals communicated between the one or more source devices and the target device during a time period.

Example 39 includes an apparatus comprising means to perform a method as set forth in any preceding example. Example 40 comprises machine-readable storage including machine-readable instructions, when executed, to implement a method or realize an apparatus as set forth in any preceding example.

In various embodiments, the operations discussed herein, e.g., with reference to FIGS. 1 et seq., may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIG. 1 et seq.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   collection logic to receive risk data from one or more source devices; and
   memory, coupled to the collection logic, to store the risk data,
   wherein pattern logic is to analyze the stored risk data to determine existence of one or more risks, wherein the risk data includes results of two-way ping signals communicated between the one or more source devices and a target device, wherein the one or more source devices comprise one or more communication devices, wherein the one or more communication devices communicate in accordance with millimeter Wave (mmWave) signals, wherein tracking logic is to track movement of the target device or presence of an obstacle based at least in part on machine learning or deep learning applied to the mmWave signals.

2. The apparatus of claim 1, wherein the pattern logic is to determine existence of the one or more risks based at least in part on a rate of occurrence of successful two-way ping signals communicated between the one or more source devices and the target device.

3. The apparatus of claim 1, comprising logic to generate a risk map of the one or more risks in a geographic area.

4. The apparatus of claim 3, wherein the target device is to receive information corresponding to the risk map before entering or during presence in the geographic area.

5. The apparatus of claim 3, wherein the geographic area comprises one or more of a parking lot, one or more street blocks, a factory floor, a warehouse, or a grocery store.

6. The apparatus of claim 3, wherein logic to generate the risk map is to generate the risk map based at least in part on Global Positing System (GPS) information.

7. The apparatus of claim 1, wherein the risk data includes the results of two-way ping signals communicated between the one or more source devices and the target device during a time period.

8. The apparatus of claim 7, wherein the time period is 100 millisecond.

9. The apparatus of claim 1, wherein the one or more communication devices are proximate or coupled to at least one of: a vehicle, a stationary object, a pedestrian, a bicyclist, a skateboarder, or a pet, wherein the one or more communication devices are to communicate the risk data.

10. The apparatus of claim 1, wherein the one or more communication devices communicate in accordance with Third Generation Partnership Project (3GPP) Long Term Evolution (LTE), Fourth Generation (4G), or Fifth Generation (5G) cellular network signals.

11. The apparatus of claim 1, comprising logic to track movement of the target device or presence of an obstacle based at least in part on reflections in the mmWave signals.

12. The apparatus of claim 1, wherein the one or more communication devices are proximate or coupled to at least a stationary object, wherein the stationary object comprises one or more of: a camera and a proximity sensor.

13. The apparatus of claim 1, wherein the one or more communication devices are proximate or coupled to at least a stationary object, wherein the stationary object is to communicate through wired or wireless communication.

14. The apparatus of claim 1, wherein the one or more communication devices comprise a smartphone, a Radio Frequency (RF) tag, or an Internet of Things (IoT) device.

15. The apparatus of claim 1, wherein a central computing device comprises one or more of: the collection logic, the pattern logic, and the memory.

16. The apparatus of claim 1, wherein at least one of the target device or the one or more source devices comprises one or more of: a processor having one or more processor cores, a Graphics Processing Unit (GPU) having one or more cores, a Field Programmable Gate Array (FPGA), the collection logic, the memory, and the pattern logic.

17. One or more computer-readable medium comprising one or more instructions that when executed on at least one processor configure the at least one processor to perform one or more operations to cause:
   collection logic to receive risk data from one or more source devices; and
   memory to store the risk data,
   wherein pattern logic is to analyze the stored risk data to determine existence of one or more risks, wherein the risk data includes results of two-way ping signals communicated between the one or more source devices and a target device, wherein the one or more source devices comprise one or more communication devices, wherein the one or more communication devices communicate in accordance with millimeter Wave (mmWave) signals, wherein tracking logic is to track movement of the target device or presence of an obstacle based at least in part on machine learning or deep learning applied to the mmWave signals.

18. The computer-readable medium of claim 17, further comprising one or more instructions that when executed on the at least one processor configure the at least one processor to perform one or more operations to cause the pattern logic to determine existence of the one or more risks based at least in part on a rate of occurrence of successful two-way ping signals communicated between the one or more source devices and the target device.

19. The computer-readable medium of claim 17, further comprising one or more instructions that when executed on the at least one processor configure the at least one processor to perform one or more operations to generate a risk map of the one or more risks in a geographic area.

20. The computer-readable medium of claim 17, wherein the risk data includes the results of two-way ping signals communicated between the one or more source devices and the target device during a time period.

21. A computing system comprising:
a processor having one or more processor cores;
memory, coupled to the processor, to store one or more bits of data; and
collection logic to receive risk data from one or more source devices; wherein the memory is to store the risk data,
wherein pattern logic is to analyze the stored risk data to determine existence of one or more risks, wherein the risk data includes results of two-way ping signals communicated between the one or more source devices and a target device, wherein the one or more source devices comprise one or more communication devices, wherein the one or more communication devices communicate in accordance with millimeter Wave (mmWave) signals, wherein tracking logic is to track movement of the target device or presence of an obstacle based at least in part on machine learning or deep learning applied to the mmWave signals.

22. The system of claim 21, wherein the pattern logic is to determine existence of the one or more risks based at least in part on a rate of occurrence of successful two-way ping signals communicated between the one or more source devices and the target device.

23. The system of claim 21, comprising logic to generate a risk map of the one or more risks in a geographic area.

24. The system of claim 21, wherein the risk data includes the results of two-way ping signals communicated between the one or more source devices and the target device during a time period.

25. The system of claim 21, wherein the one or more communication devices are proximate or coupled to at least one of: a vehicle, a stationary object, a pedestrian, a bicyclist, a skateboarder, or a pet, wherein the one or more communication devices are to communicate the risk data.

* * * * *